United States Patent
Irie et al.

(10) Patent No.: US 11,427,689 B2
(45) Date of Patent: Aug. 30, 2022

(54) STRETCHABLE CONDUCTOR SHEET AND PASTE FOR FORMING STRETCHABLE CONDUCTOR SHEET

(71) Applicant: TOYOBO CO., LTD., Osaka (JP)

(72) Inventors: Michihiko Irie, Shiga (JP); Satoshi Imahashi, Shiga (JP); Hiromichi Yonekura, Shiga (JP); Takashi Kondo, Shiga (JP); Maki Kinami, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 826 days.

(21) Appl. No.: 16/082,382

(22) PCT Filed: Mar. 8, 2017

(86) PCT No.: PCT/JP2017/009219
§ 371 (c)(1),
(2) Date: Sep. 5, 2018

(87) PCT Pub. No.: WO2017/154978
PCT Pub. Date: Sep. 14, 2017

(65) Prior Publication Data
US 2019/0077930 A1 Mar. 14, 2019

(30) Foreign Application Priority Data

Mar. 9, 2016 (JP) ............................. JP2016-046136
Mar. 9, 2016 (JP) ............................. JP2016-046137
Mar. 9, 2016 (JP) ............................. JP2016-046138

(51) Int. Cl.
*B32B 27/08* (2006.01)
*C08J 5/18* (2006.01)
(Continued)

(52) U.S. Cl.
CPC ................. *C08J 5/18* (2013.01); *B32B 27/08* (2013.01); *C08K 3/08* (2013.01); *C08K 3/22* (2013.01);
(Continued)

(58) Field of Classification Search
CPC ... C04J 5/18; B32B 27/08; C08K 3/22; C08L 101/00; C08L 2203/16; H01B 1/22
(Continued)

(56) References Cited

U.S. PATENT DOCUMENTS 6,309,563 B1 10/2001 Iino et al.
2003/0213939 A1 11/2003 Narayan et al.
(Continued)

FOREIGN PATENT DOCUMENTS

EP 1 039 480 9/2000
EP 2 924 695 9/2015
(Continued)

OTHER PUBLICATIONS

Office Action dated Apr. 13, 2021 in corresponding Japanese Patent Application No. 2018-504555 with English-language translation.
(Continued)

Primary Examiner — Jeffrey M Wollschlager
Assistant Examiner — Xue H Liu
(74) Attorney, Agent, or Firm — Wenderoth, Lind & Ponack, L.L.P.

(57) ABSTRACT

A first object of the present invention is to provide a stretchable conductor sheet that exhibits isotropic conductivity when stretched in a predetermined direction or in a direction perpendicular to the predetermined direction, and a paste for forming a stretchable conductor sheet, which is used for the stretchable conductor sheet. A second object of the present invention is to provide a stretchable conductor sheet having a small change in specific resistance even when
(Continued)

repeatedly twisted, and a paste for forming a stretchable conductor sheet, which is used for the stretchable conductor sheet. A third object of the present invention is to provide a stretchable conductor sheet having a small change in specific resistance even when repeatedly washed, and a paste for forming a stretchable conductor sheet, which is used for the stretchable conductor sheet. The first object of the present invention can accomplish a stretchable conductor sheet having a thickness of 3 to 800 µm, the stretchable conductor sheet comprising at least conductive particles, inorganic particles surface-treated with a hydroxide and/or an oxide of one or both of Al and Si, and a flexible resin having a tensile elastic modulus of 1 MPa or more and 1000 MPa or less, wherein in each of two orthogonal directions, a specific resistance change ratio of the sheet at a time of elongation by 40% with respect to an original length is less than ±10% in an elongation direction.

4 Claims, 4 Drawing Sheets

(51) Int. Cl.

| | | |
|---|---|---|
| C08K 3/22 | (2006.01) | |
| C08L 101/00 | (2006.01) | |
| H01B 1/22 | (2006.01) | |
| C08L 9/04 | (2006.01) | |
| C08K 3/08 | (2006.01) | |
| C09C 1/36 | (2006.01) | |
| C08L 9/08 | (2006.01) | |
| C09C 3/06 | (2006.01) | |
| C08K 9/02 | (2006.01) | |
| C09C 1/02 | (2006.01) | |
| C08K 3/30 | (2006.01) | |

(52) U.S. Cl.
CPC .................. *C08K 9/02* (2013.01); *C08L 9/04* (2013.01); *C08L 9/08* (2013.01); *C08L 101/00* (2013.01); *C09C 1/027* (2013.01); *C09C 1/3653* (2013.01); *C09C 1/3661* (2013.01); *C09C 3/06* (2013.01); *C09C 3/063* (2013.01); *H01B 1/22* (2013.01); *C08K 2003/0806* (2013.01); *C08K 2003/2241* (2013.01); *C08K 2003/3045* (2013.01); *C08K 2201/001* (2013.01); *C08K 2201/003* (2013.01); *C08K 2201/016* (2013.01); *C08L 2203/16* (2013.01)

(58) Field of Classification Search
USPC .......................................................... 428/98
See application file for complete search history.

(56) References Cited

U.S. PATENT DOCUMENTS

| | | |
|---|---|---|
| 2016/0372230 A1 | 12/2016 | Imahashi |
| 2018/0020936 A1 | 1/2018 | Kwon et al. |
| 2019/0013111 A1 | 1/2019 | Yonekura et al. |
| 2019/0053372 A1 | 2/2019 | Kwon et al. |
| 2019/0077930 A1 | 3/2019 | Irie et al. |
| 2020/0291273 A1 | 9/2020 | Kwon et al. |

FOREIGN PATENT DOCUMENTS

| | | |
|---|---|---|
| EP | 3 404 670 | 11/2018 |
| EP | 3 415 021 | 12/2018 |
| JP | 63-203887 | 8/1988 |
| JP | 2005-521782 | 7/2005 |
| JP | 2007-173226 | 7/2007 |
| JP | 2012-54192 | 3/2012 |
| JP | 2015-186868 | 10/2015 |
| JP | 2017-168438 | 9/2017 |
| WO | 2014/080470 | 5/2014 |
| WO | 2015/005204 | 1/2015 |
| WO | 2016/114298 | 7/2016 |

OTHER PUBLICATIONS

Partial Supplementary European Search Report dated Oct. 18, 2019 in corresponding European Application No. 17763318.7.
Extended European Search Report dated Jan. 24, 2020 in corresponding European Patent Application No. 17763318.7.
Office Action dated Apr. 17, 2020 in corresponding Taiwanese Patent Application No. 106107663 with English-language translation.
Notice of Submission of Information by Third Parties dated Aug. 4, 2020 in corresponding Japanese Patent Application No. 2018-504555 with English-language translation.
Office Action dated Feb. 2, 2021 in corresponding Taiwanese Patent Application No. 109124168, with English Translation.
International Search Report dated Jun. 13, 2017 in International (PCT) Application No. PCT/JP2017/009219.
Ahn et al., "Stretchable electronics: materials, architectures and integrations", Journal of Physics D: Applied Physics, Vo. 45, 2012, 103001, pp. 1-14.
Chun et al., "Highly conductive, printable and stretchable composite films of carbon nanotubes and silver", Nature Nanotechnology, vol. 5, Dec. 2010, 853-857.
Office Action dated Oct. 27, 2020 in corresponding Japanese Patent Application No. 2018-504555 with English-language translation.
Communication pursuant to Article 94(3) EPC dated Nov. 30, 2021 in corresponding European Patent Application No. 17 763 318.7.
Notice of Reasons for Refusal dated Jan. 4, 2022 in corresponding Japanese Patent Application No. 2021-026078, with Machine Translation.
Notice of Reasons for Refusal dated Jan. 4, 2022 in corresponding Japanese Patent Application No. 2021-026080, with Machine Translation.
Notice of Reasons for Refusal dated Feb. 1, 2022 in Japanese Application No. 2021-026079, with English machine translation.
Decision of Refusal dated May 31, 2022 in Japanese Application No. 2021-026078, with English machine translation.
Decision of Refusal dated May 31, 2022 in Japanese Application No. 2021-026080, with English machine translation.

[Fig.1]
(A)
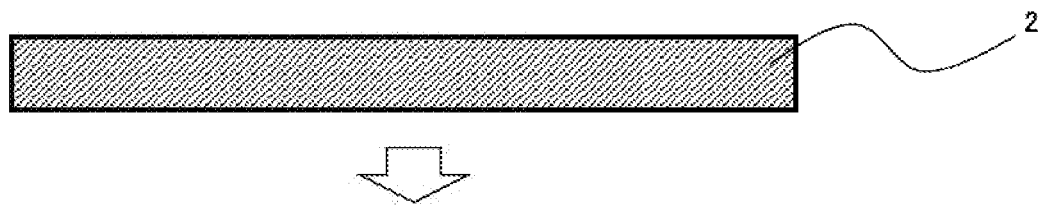
(B)
(C)
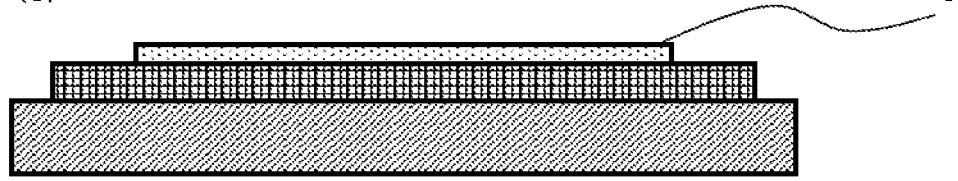
(D)
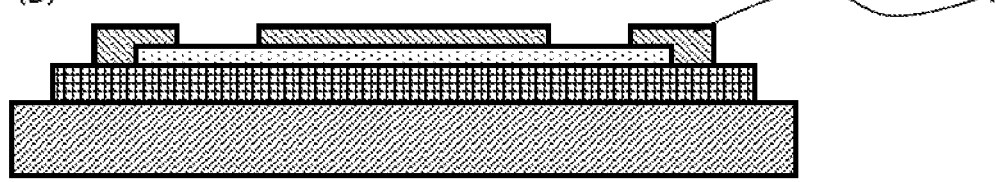
(E)
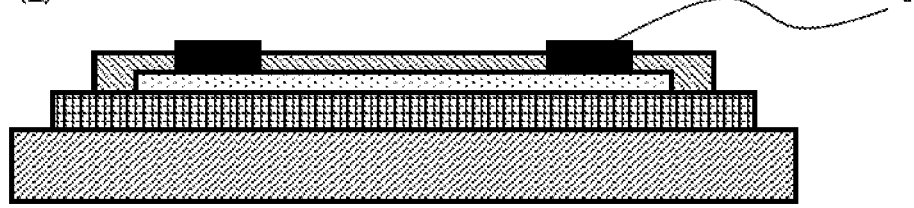
(F)
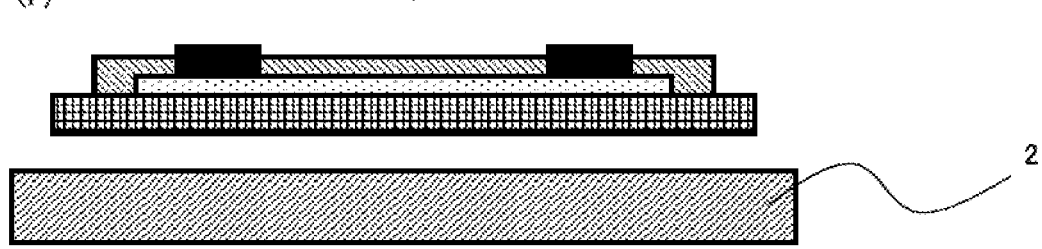

[Fig.2]
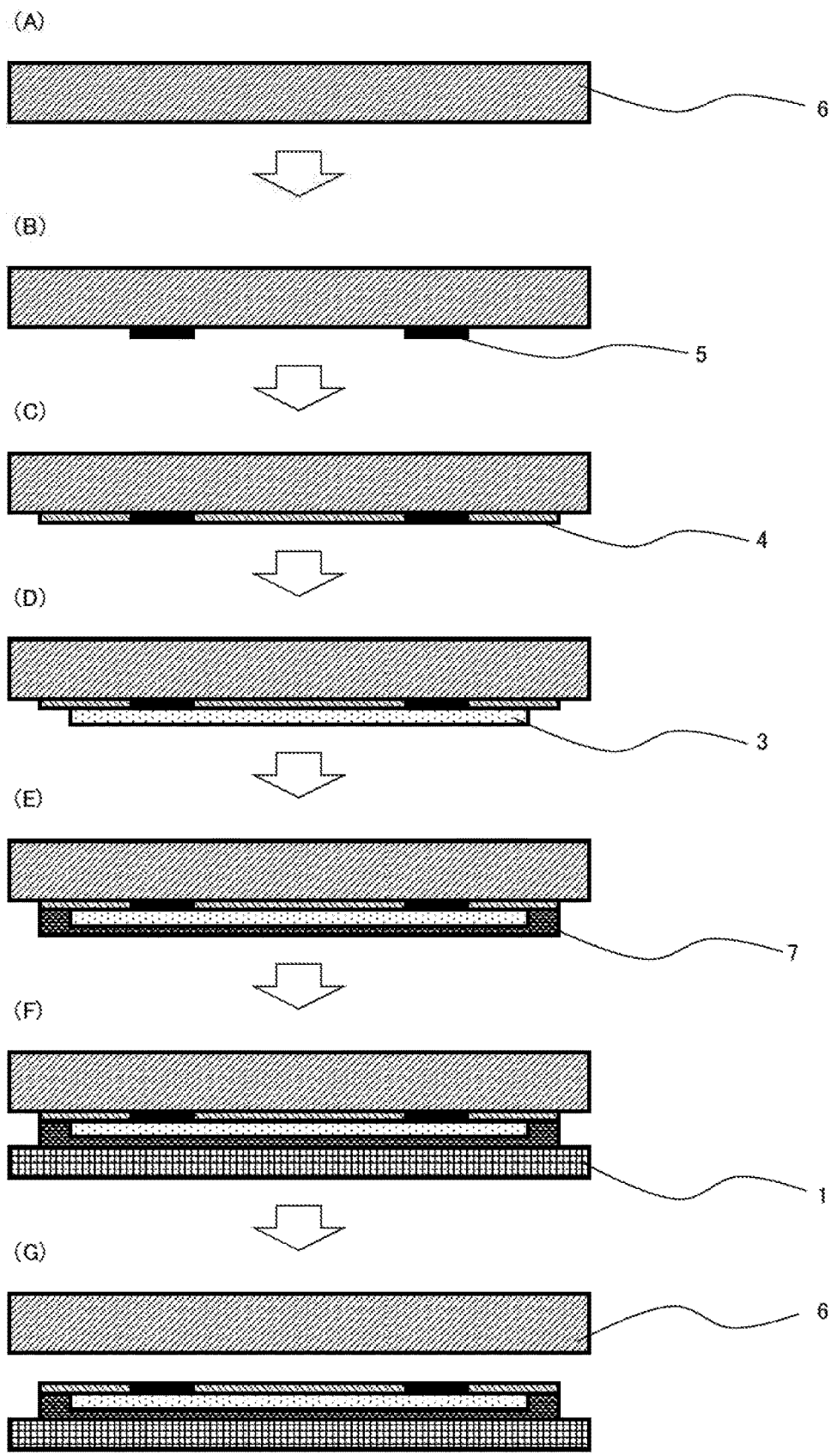

【Fig.3】
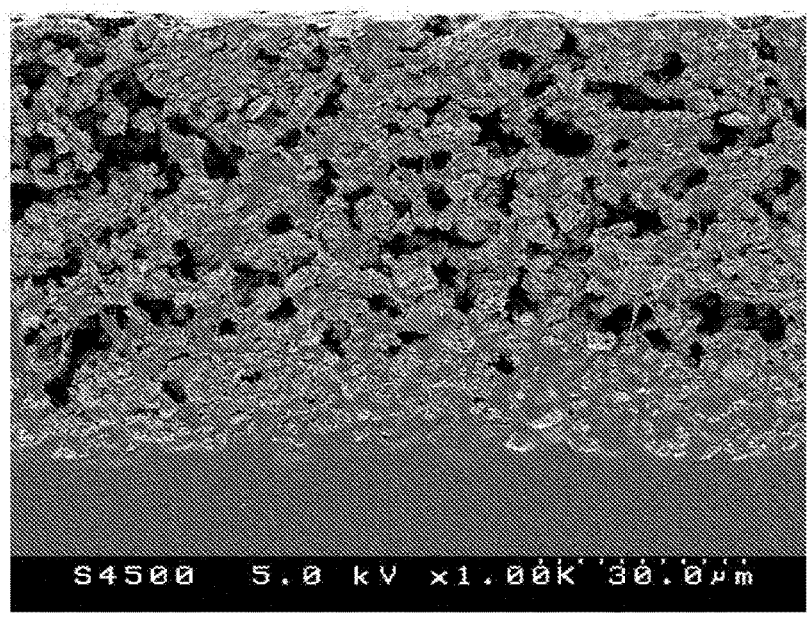
【Fig.4】
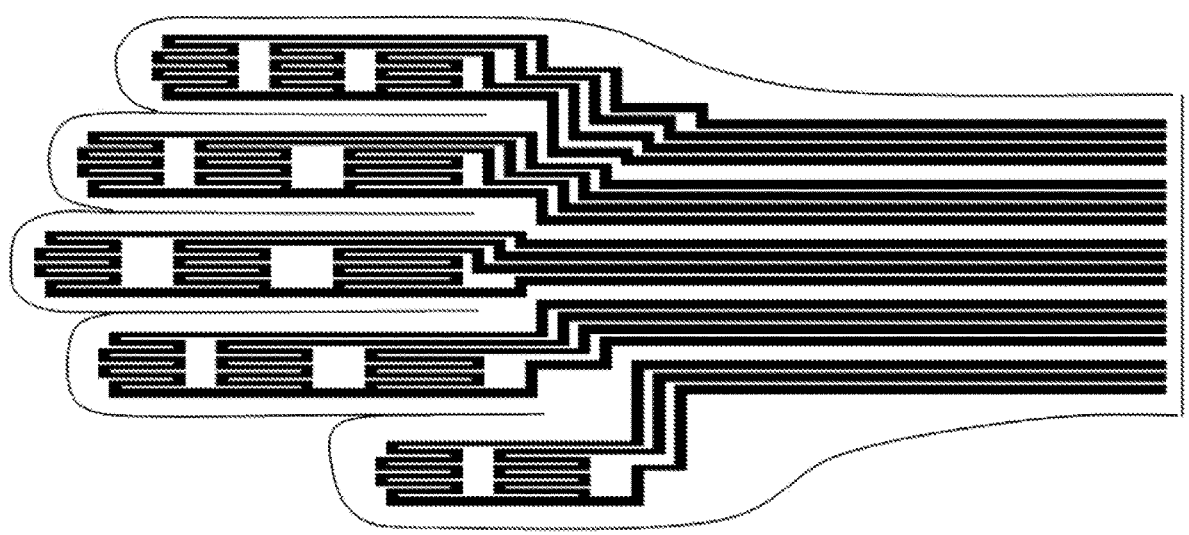

[Fig.5]
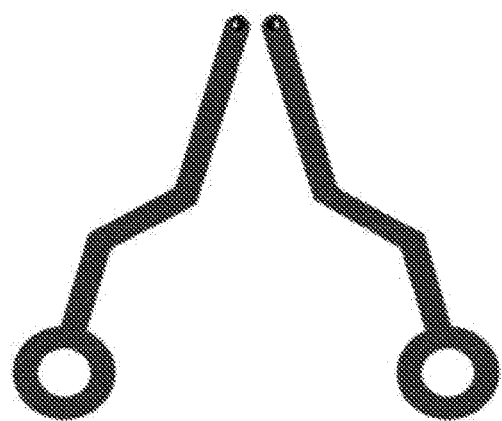
[Fig.6]
[Fig.7]
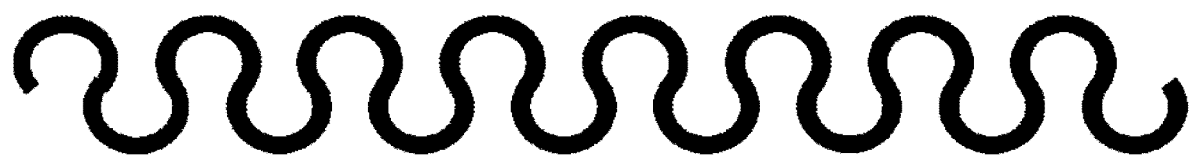

STRETCHABLE CONDUCTOR SHEET AND PASTE FOR FORMING STRETCHABLE CONDUCTOR SHEET

TECHNICAL FIELD

The present invention relates to a stretchable conductor sheet used for an electrical wiring or the like. In particular, the present invention relates to a stretchable conductor sheet which has improved durability against repeated elongation and which can be used for a wiring portion, an electrode portion, or the like when incorporating electronics into a garment (an item of clothing) or the. like, and a paste for forming a stretchable conductor sheet, which is used for the stretchable conductor sheet.

BACKGROUND ART

Recently, a wearable electronic device intended to use an electronic device having input/output function, calculation function, and communication function in a state of being very close. to or in close contact with a body has been developed. As such a wearable electronic device, devices with an accessory-type shape such as a wristwatch, eyeglasses, and earphones, and a textile-integrated device where electronic functions are incorporated into a garment are known.

An electrical wiring for power supply and signal transmission is necessary for an electronic device. In particular, for a textile-integrated wearable electronic device, the electrical wiring is required to have stretchability in accordance with a stretchable garment. Usually an electrical wiring composed of a metal wire or metal foil inherently has no practical stretchability, and hence a technique for providing stretching capabilities in a pseudo manner by arranging a metal wire or metal foil in a wave shape or in a repeated horseshoes shape is employed.

In the case of the metal wire, it is possible to form a wiring by regarding the metal wire as an embroidery yarn and sewing it into a garment. However, it is clear that such a method is not suitable for mass production.

A method of forming a wiring by etching the metal foil is common as a method for producing a printed wiring board. A method is known in which the metal foil is attached to a stretchable resin sheet, and a wave-shaped wire is formed in the same manner as in the printed wiring board to make a stretchable wiring in a pseudo manner (Non-Patent Document 1). In this method, a stretchability is given in a pseudo manner by twist deformation of the wave-shaped wiring portion. However, metal foil varies also in the thickness direction due to the twist deformation, and thus if the metal foil is used as a part of a garment, the garment has uncomfortable wearing feeling, which is not preferable. In addition, when the metal foil undergoes excessive deformation due to washing or the like, permanent plastic deformation occurs in the metal foil, and the wiring may have the problem of the durability.

As a method to realize a stretchable conductor wiring, a method using a special conductive paste has been proposed. In such a method, conductive particles such as silver particles, carbon particles, and carbon nanotubes, elastomer such as urethane resin with stretchability, natural rubber, or synthetic rubber, and a solvent etc. are kneaded to form a paste, and using the resulting paste, a wiring is printed and drawn on a garment directly or in combination with a stretchable film substrate or the like.

A conductive composition composed of conductive particles and a stretchable binder resin can macroscopically realize a stretchable conductor. From a microscopic viewpoint, in the conductive composition obtained from the above-mentioned paste, the resin binder portion is deformed upon receiving an external force, and the conductivity is maintained within a range in which the electrical chain of the conductive particles is not broken. The resistivity observed macroscopically is higher than that of metal wires or metal foil. However since the composition itself has stretchability, the wiring is not required to have a shape like a wave-shaped wiring, and flexibility in the width and the thickness of the wiring increases. Therefore, on a practical level, it is possible to realize a wiring with a low resistance compared with a metal wire.

Patent Document 1 discloses a technique in which silver particles and silicone rubber are combined, and the conductive film on the silicone rubber substrate is further covered with silicone rubber to suppress degradation of conductivity during elongation. Patent Document 2 discloses a combination of silver particles and a polyurethane emulsion and that a conductive film with high conductivity and a high elongation ratio can be obtained.

Furthermore, many examples have also been proposed in which improvement of characteristics is attempted by combining conductive particles having a high aspect ratio such as carbon nanotubes, silver fillers, and the like.

RELATED ART DOCUMENTS

Patent Documents

Patent Document 1: JP-A-2007-173226
Patent Document 2: JP-A-2012-54192

Non-Patent Documents

Non-Patent Document 1: Jong-Hyun Ahn and Jung Ho Je, "Stretchable electronics: materials, architectures and integrations" J. Phys. D: Appl. Phys. 45(2012)103001 Non-Patent Document 2: Kyoung-Yong Chun, Youngseok Oh, Jonghyun Rho, Jong-Hyun Ahn, Young-Jin Kim, Hyoung Ryeol Choi and Seunghyun Baik, "Highly conductive, printable and stretchable composite films of carbon nanotubes and silver" Nature Nanotechnology, 5,853(2010)

DISCLOSURE OF THE INVENTION

Problems to be Solved by the Invention

However, in the above-mentioned composition in which conductive particles are blended with a resin, there is no particular bonding three between the conductive particles, and when deformation is repeated, the electrical chain between the conductive particles may gradually break, thereby resulting in deterioration of conductivity.

On the other hand, even if conductivity can be secured with a stretchable conductor sheet or a fabric using the stretchable conductor sheet as a wiring by adding inorganic particles to the composition, there is the possibility that anisotropic conductive property is developed by for example, stretching in X and Y directions, so that electric signals associated with movement of a subject are not properly output. In many cases, a wiring pattern formed on a garment has a two-dimensionally complicated shape. When a necessary part is cut out from a stretchable conductor sheet, and used as a wiring, there is the problem that if sheet properties have anisotropy, the arrangement of the pattern is limited, leading to reduction of the productivity of a wiring obtained from the sheet (first problem).

Further, even if conductivity can be secured with a stretchable conductor sheet or a fabric using the stretchable conductor sheet as a wiring by adding inorganic particles to the composition, there is the possibility that for example when the stretchable conductor sheet is repeatedly twisted, the specific resistance of the sheet increases, so that electric signals associated with movement of a subject are not properly reflected (second problem).

Further, a composition in which the conductive particles are blended with a resin has a problem in durability against deformation such as elongation, compression or twist due to washing which is unavoidable when the composition is applied to an electrical wiring on a garment. For example, an electrical wiring during washing is forced to undergo large deformation such as elongation, compression or twist repeatedly by an external force in an aqueous medium containing a surfactant, so that the conductivity of the stretchable conductor sheet is deteriorated (third problem).

Thus, a first object of the present invention is to provide a stretchable conductor sheet that exhibits isotropic conductivity when stretched in a predetermined direction or in a direction perpendicular to the predetermined direction, and a paste for forming a stretchable conductor sheet, which is used for the stretchable conductor sheet. In this specification, the predetermined direction means a direction in which the paste for forming a stretchable conductor sheet is applied, and the direction perpendicular to the predetermined direction means a direction perpendicular to the direction in which the paste for forming a stretchable conductor sheet is applied.

A second object of the present invention is to provide a stretchable conductor sheet having a small change in specific resistance even when repeatedly twisted, and a paste for forming a stretchable conductor sheet, which is used for the stretchable conductor sheet.

A third object of the present invention is to provide a stretchable conductor sheet having a small change in specific resistance even when repeatedly washed, and a paste for forming a stretchable conductor sheet, which is used for the stretchable conductor sheet.

Solutions to the Problems

The present inventors have extensively conducted studies for achieving the above-described objects, and resultantly found that the first to third objects can be achieved by the following means, leading to completion of the present invention.

That is, the first embodiment of the present invention, which can accomplish the first object of the present invention described above, is a stretchable conductor sheet having a thickness of 3 to 800 µm, the stretchable conductor sheet comprising at least conductive particles, inorganic particles surface-treated with a hydroxide and/or an oxide of one or both of Al and Si, and a flexible resin having a tensile elastic modulus of 1 MPa or more and 1000 MPa or less, wherein in each of two orthogonal directions, a specific resistance change ratio of the sheet at a time of elongation by 40% with respect to an original length is less than ±10% in an elongation direction.

The inorganic particles are preferably contained in an amount of 2.0 to 30% by mass based on 100% by mass of a total of the conductive particles and the inorganic particles. The inorganic particles preferably have an average particle diameter smaller than an average particle diameter of the conductive particles. The conductive particles preferably have an average particle diameter of 0.5 to 20 µm, and the conductive particles are silver particles.

Another embodiment of the present invention is a paste for forming a stretchable conductor sheet, which is used for producing the stretchable conductor sheet above, the paste comprising at least conductive particles, inorganic particles surface-treated with a hydroxide and/or an oxide of one or both of Al and Si, a flexible resin having a tensile elastic modulus of 1 MPa or more and 1000 MPa or less, and a solvent, wherein the inorganic particles are contained in an amount of 2.0 to 30% by mass based on 100% by mass of a total of the conductive particles and the inorganic particles, and the flexible resin is contained in an amount of 7 to 35% by mass based on 100% by mass of a total of the conductive particles, the inorganic particles, and the flexible resin.

The second embodiment of the present invention, which can accomplish the second object of the present invention described above, is a stretchable conductor sheet having a thickness of 3 to 800 µm, the stretchable conductor sheet comprising at least conductive particles, inorganic particles having an aspect ratio of less than 1.5, and a flexible resin having a tensile elastic modulus of 1 MPa or more and 1000 MPa or less, wherein a specific resistance of the sheet after a twist cycle in a following twist test is repeated 100 times is 3.0 times or less an initial specific resistance, in the twist test, a sample having a width of 10 mm and a length of 100 mm is used and twisted with the sample fixed at one end in a longitudinal direction and turned at another end in the longitudinal direction, and as the twist cycle, the sample is twisted by 10 turns in a positive direction (3600°), returned to an initial state, twisted by 10 turns in a negative direction (−3600°), returned to the initial state.

The inorganic particles are preferably surface-treated with a hydroxide and/or an oxide of one or both of Al and Si. The inorganic particles are preferably contained in an amount of 2.0 to 30% by mass based on 100% by mass of a total of the conductive particles and the inorganic particles. The inorganic particles preferably have an average particle diameter smaller than an average particle diameter of the conductive particles. The conductive particles preferably have an average particle diameter of 0.5 to 20 µm, and the conductive particles are silver particles.

The present invention includes a paste for fanning a stretchable conductor sheet, which is used for producing the stretchable conductor sheet above, the paste comprising at least conductive particles, inorganic particles having an aspect ratio of less than 1.5, a flexible resin having a tensile elastic modulus of 1 MPa or more and 1000 MPa or less, and a solvent, wherein the inorganic particles are contained in an amount of 2.0 to 30% by mass based on 100% by mass of a total of the conductive particles and the inorganic particles, and the flexible resin is contained in an amount of 7 to 35% by mass based on 100% by mass of a total of the conductive particles, the inorganic particles, and the flexible resin.

The third embodiment of the present invention, which can accomplish the third object of the present invention described above, is a stretchable conductor sheet comprising at least conductive particles, and a flexible resin having a tensile elastic modulus of 1 MPa or more and 1000 MPa or less, the stretchable conductor sheet having a void ratio of 10% by volume or more and 50% by volume or less.

The conductive particles are preferably aggregated silver particles having an average particle diameter of 0.8 to 10 µm, the stretchable conductor sheet further includes inorganic particles having an aspect ratio of less than 1.5, and an average particle diameter of 0.5 times or less the average particle diameter of the aggregated silver particles, the stretchable conductor sheet has a thickness of 3 to 800 μm, and a specific resistance after compression by 10% is repeated 100 times is 2.4 times or less an initial specific resistance.

The inorganic particles are preferably surface-treated with a hydroxide and/or an oxide of one or both of Al and Si. The inorganic particles are preferably contained in an amount of 2.0 to 30% by mass based on 100% by mass of a total of the aggregated silver particles and the inorganic particles. The inorganic particles preferably have an average particle diameter smaller than an average particle diameter of the aggregated silver particles.

The present invention includes a paste, for forming a stretchable conductor sheet, which is used for producing the stretchable conductor sheet above, the paste comprising at least aggregated silver particles having an average particle diameter of 0.8 to 10 μm, inorganic particles having an aspect ratio of less than 1.5 and an average particle diameter of 0.5 times or less the average particle diameter of the aggregated silver particles, a flexible resin having a tensile elastic modulus of 1 MPa or more and 1000 MPa or less, and a solvent, wherein the inorganic particles are contained in an amount of 2.0 to 30% by mass based on 100% by mass of a total of the aggregated silver particles and the inorganic particles, and the flexible resin is contained in an amount of 7 to 35% by mass based on 100% by mass of a total of the aggregated silver particles, the inorganic particles, and the flexible resin.

Effects of the Invention

It is well known that a stretchable conductor composition including a conductive filler and a binder resin generally develops direction-dependent anisotropy in conductivity depending on an extrusion direction in sheet formation, or an application direction. Efforts have been made to minimize anisotropy in conductivity by an engineering technique to the extent that anisotropy in conductivity is normally negligible. However, it has been found that repeated cutoff of a conductive path by microcracks generated due to elongation deteriorated the conductivity of a sheet obtained from the stretchable conductor composition. The microcracks are easily generated in a direction perpendicular to an elongation direction when first elongation occurs. When elongation occurs in different directions after second and subsequent elongations, deformation in different directions is reduced by the deformation centering on the microcracks generated first. Thus, once a sheet and film of the stretchable conductor composition is elongated, anisotropy is resultantly developed conductivity.

On the other hand, in the first embodiment of the present invention, the composition and sheet contains specific inorganic particles. Normally since non-conductive inorganic particles hinder conductivity, use of non-conductive inorganic particles in a conductive composition containing a conductive filler and a binder resin is not preferred except that an extremely small amount of nano-sized silica particles are added for the purpose of improving printing property and the like. However, according to the first embodiment of the present invention, inorganic particles surface-treated with a hydroxide and/or an oxide of one or both of Al and Si improve dispersibility of the inorganic particles in a flexible resin, the inorganic particles function as a key factor in resin deformation when the resin portion is deformed by an external force, the resin shrinks with the key factor as a local center when shrinking after removal of the external force, and therefore the resin is more easily restored to a shape close to that before stretching as compared to a case where the key factor is not present. Therefore, generation of microcracks in first elongation deformation can be suppressed, and inorganic particles decentralize the orientation of microcracks, resulting in development of such an excellent effect that anisotropy in X and Y directions is considerably improved.

In addition, according to the first embodiment of the present invention, it is possible to efficiently produce a wiring such as a horseshoe-shaped wiring (corrugated wiring) from a stretchable conductor sheet having isotropic conductivity.

In addition, according to the second embodiment of the present invention, it is possible to reduce a change in specific resistance even when the wiring is repeatedly twisted (hereinafter, sometimes referred to as twist resistance). The effect (twist resistance) may be developed in accordance with the following action mechanism. That is, when the resin portion is two-dimensionally deformed by twist, inorganic particles function as a key factor in resin deformation, and when the resin portion deformed by elongation in the plane direction is restored to an original state, the resin returns to an initial state with the key factor as a local center. Therefore, restoration anisotropy is reduced. When this mechanism is extended to three-dimensional deformation, the same effect is developed in the thickness direction by using inorganic particles having a smaller aspect ratio, the inorganic particles also function as a key factor in resin deformation for three-dimensional deformation such as twist, and the resin returns to an initial state with the key factor as a local center in removal of twist, so that the resin is more easily restored to a shape close to that before twist as compared to a case where the key factor is not present, and for example, the restoring force after twist in a predetermined direction (e.g. positive direction) is equal to the restoring force after twist in a direction (e.g. negative direction) opposite to the predetermined direction. Thus, even when twist is repeatedly applied due to washing or dressing, a change in specific resistance can be reduced.

On the other hand, when the stretchable conductor sheet of the present invention is used for a horseshoe-shaped wiring (corrugated wiring (see FIG. 7), deformation is absorbed by twist resistance rather than stretch resistance, and thus the stretching ratio is substantially reduced, so that stretching durability is further improved.

Further, the present inventors have observed many cases where conductivity is reduced when a garment having an electrical wiring obtained from the stretchable conductor sheet is washed. The present inventors have found that such reduction of conductivity is caused by fine cracks generated in the stretchable conductor sheet and falling/loss of a part of the stretchable conductor sheet, and that partial falling of the stretchable conductor sheet is caused by buckling failure of the stretchable conductor sheet due to compression. Thus, the stretchable conductor sheet of the third embodiment of the present invention includes a predetermined range of voids therein. Normally, in a conductive composition containing a conductive filler and a matrix resin, such voids are not preferred because they inhibit conductivity. However, the present inventors have found that moderately controlled voids develop a dynamic cushioning effect of absorbing compressive deformation to prevent buckling failure due to compression. As a result, a change in specific resistance in repeated occurrence of compressive deformation can be reduced (i.e. compression resistance can be imparted), and washing resistance can be improved.

BRIEF DESCRIPTION OF THE DRAWINGS

FIG. 1 is a diagram showing one example of a method for forming a stretchable conductor sheet of the present invention on a fabric by a direct printing method.

FIG. 2 is a diagram showing one example of the method for forming a stretchable conductor sheet of the present invention on a fabric by a transfer method.

FIG. 3 is a picture obtained by photographing a cross-section of the stretchable conductor sheet of the present invention with a scanning electron microscope.

FIG. 4 is a drawing in which a wiring composed of the stretchable conductor sheet of the present invention is formed on a glove-shaped apparatus.

FIG. 5 is a view showing one example of a wiring formed of stretchable conductor sheet of the present invention.

FIG. 6 is a diagram showing one example in which the wiring in FIG. 5 is used for a shirt.

FIG. 7 is a view showing one example of a horseshoe-shaped wiring formed of the stretchable conductor sheet of the present invention.

MODE FOR CARRYING OUT THE INVENTION

A first embodiment of the present invention is a stretchable conductor sheet including at least conductive particles, a flexible resin and inorganic particles. The inorganic particles are surface-treated with a hydroxide and/or an oxide of one or both of Al and Si. In each of two orthogonal directions, a specific resistance change ratio of the sheet at the time of elongation by 40% with respect to an original length is less than ±10% in an elongation direction.

A second embodiment of the present invention is a stretchable conductor sheet including at least conductive particles, a flexible resin and inorganic particles. The inorganic particles have an aspect ratio of less than 1.5, and a specific resistance of the sheet after a twist cycle in a twist test is repeated 100 times is 3.0 times or less an initial specific resistance.

A third embodiment of the present invention is a stretchable conductor sheet including at least conductive particles and a flexible resin, and having a void ratio of 10% by volume or more and 50% by volume or less.

Hereinafter, components to be used in the stretchable conductor sheet and a paste for forming a stretchable conductor sheet according to the present invention will be described.

Conductive Particles

Conductive particles that are used in the first to third embodiments of the present inventions are the same, and particularly in the third embodiment of the present invention it is preferable to use aggregated silver particles having an average particle diameter of 0.8 to 10 µm as conductive particles. The conductive particle is preferably a particle which is composed of a substance having a specific resistance of $1 \times 10^{-1}$ Ωcm or less, and which has a particle diameter of 100 µm or less.

Examples of the substance having a specific resistance of $1 \times 10^{-1}$ Ωcm or less may include metals, alloys, carbon, doped semiconductors and conductive polymers.

Examples of the conductive particles that are preferably used in the present invention include metal particles of silver, gold, platinum, palladium, copper, nickel, aluminum, zinc, lead, tin and the like, alloy particles of brass, bronze, cupronickel, solder and the like, hybrid particles of silver-coated copper and the like, metal-plated polymer particles, metal-plated glass particles, and metal-coated ceramic particles. Only one kind or two or more kinds of the conductive particles may be used.

Among them, the conductive particles are especially preferably silver particles etc. from the viewpoint of high conductivity and cost.

Examples of the silver particles may include scaly silver powder and aggregated silver powder, and it is preferable to use the silver powder as a main body in the conductive particles. The term "aggregation" means that primary particles are three-dimensionally aggregated, and the shape of the primary particles is not particularly limited, and may be spherical or irregular. The shape of the aggregated silver powder is not particularly limited, and may be irregular. In the present invention, the term "used as a main body" means that silver powder is used in a ratio of 90% by mass or more based on 100% by mass of conductive particles. The amount of silver particles is preferably 93% by mass or more, more preferably 96% by mass or more, still more preferably 99% by mass or more, especially preferably 100% by mass based on 100% by mass of conductive particles.

The scaly silver powder and aggregated silver powder are preferable because they have a specific surface area larger than spherical silver powder or the like, and hence an electrical conductivity network can be formed even when the filling amount is small. The aggregated silver powder, which is not in a monodisperse form, is further preferable because the particles physically contact with each other, and hence an electrical conductivity network can be easily formed.

Although there is no particular limitation for the particle diameter of the scaly silver powder, the average particle diameter (50% D) measured by a dynamic light scattering method is preferably 0.5 to 20 µm, more preferably 0.7 to 18 µm, still preferably 0.9 to 15 µm and still more preferably 1.1 to 12 µm. If the average particle diameter exceeds 20 µm, the formation of a fine wiring may become difficult, and clogging occurs in the case of screen printing or the like. On the other hand, if the average particle diameter is less than 0.5 µm, the particles cannot contact with each other when the filling amount is small, and as a result, the electrical conductivity may deteriorate.

Although there is no particular limitation for the particle diameter of the aggregated silver powder, the average particle diameter (50% D) measured by a light scattering method is preferably 0.8 to 20 µm, more preferably 1 to 20 µm, still preferably 2 to 15 µm and especially preferably 3 to 12 µm. If the average particle diameter exceeds 20 µm, the dispersibility decrease, and as a result, paste formation may become difficult. On the other hand, if the average particle diameter is less than 0.8 µm (especially less than 1 µm), the effects as the aggregated powder is lost, and as a result, high electrical conductivity may not be maintained when the filling amount is small.

When the conductive particles are non-spherical, the aspect ratio of the conductive particles is preferably less than 1.5, more preferably 1.45 or less, still more preferably 1.40 or less. When the aspect ratio of the conductive particles is above the above-mentioned range, there is the possibility that stretchability and twist resistance are deteriorated.

The conductive particles are contained in an amount of preferably 50 to 95% by mass, more preferably 55 to 90% by mass, still more preferably 60 to 85% by mass based on 100% by mass of the total of the flexible resin, the inorganic particles and the conductive particles. When the amount is below the above-mentioned range, there is the possibility that sufficient conductivity cannot be secured. On the other hand, when the amount is above the above-mentioned range, stretchability and isotropic conductivity may be deteriorated.

Particularly in the third embodiment of the present invention, it is preferable to use aggregated silver particles having an average particle diameter of 0.8 to 10 μm as the conductive particles. By using the aggregated silver particles, particularly high compression resistance can be attained.

As the aggregated silver particles, irregular-shaped aggregated silver powder or the like can be used as long as it can improve not only the conductivity but also the void ratio of the sheet.

In the third embodiment of the present invention, the particle diameter of the aggregated silver powder used for attaining particularly high compression resistance is not particularly limited, and the average particle diameter (50% D) measured by a light scattering method is preferably 0.8 to 10 μm, more preferably 0.9 to 9 μm, still more preferably 1.0 to 8 μm, still more preferably 1.1 to 7 μm. When the average particle diameter is more than 10 μm, dispersibility is deteriorated, so that it is difficult to form a paste. On the other hand, when the average particle diameter is less than 0.8 μm, the effect as aggregated powder may be reduced to the extent that favorable conductivity cannot be maintained at a low filling ratio.

The aggregated silver particles are contained in an amount of preferably 50 to 95% by mass, more preferably 55 to 90% by mass, still more preferably 60 to 85% by mass based on 100% by mass of the total of the flexible resin, the inorganic particles, and the aggregated silver particles. When the amount is below the above-mentioned range, there is the possibility that sufficient conductivity cannot be secured. On the other hand, when the amount is above the above-mentioned range, there is the possibility that stretchability and compression resistance are deteriorated.

Inorganic Particles

In the first embodiment of the present invention, inorganic particles surface-treated with a hydroxide and/or an oxide of one or both of Al and Si are used, and in the second embodiment of the present invention, inorganic particles having an aspect ratio of less than 1.5 are used. In the third embodiment of the present invention, it is not required to use inorganic particles, and when inorganic particles are used, it is preferable to use inorganic particles having an aspect ratio of less than 1.5 and an average particle diameter of 0.5 times or less the average particle diameter of aggregated silver particles.

The inorganic particles that are used in the first embodiment of the present invention are surface-treated with a hydroxide and/or an oxide of one or both of Al and Si. "Being surface-treated" means that a hydroxide and/or an oxide of one or both of Al and Si is formed on the surface of the inorganic particle, and the hydroxide and/or oxide of one or both of Al and Si may be formed on at least a part of, preferably the whole of, the surface of the inorganic particle. The inorganic particles contribute to improvement of dispersibility in a flexible resin, and can isotropically develop conductivity in stretching in different directions. The isotropic conductivity is considered to be developed in accordance with the following mechanism action.

That is, the inorganic particles function as a key factor in resin deformation when the resin portion is deformed by an external force, the resin shrinks with the key factor as a local center when shrinking after removal of the external force, and therefore the resin is more easily restored to a shape close to that before stretching as compared to a case where the key factor is not present. For example, the restoring force after stretching in the X direction is equal to the restoring force after stretching in the Y direction. Thus, even when stretching occurs in a specific direction due to washing or dressing, conductivity in the Y direction after stretching in the X direction is not deteriorated, and isotropic conductivity can be exhibited..

Examples of the inorganic particles include particles of barium sulfate, titanium oxide, zinc oxide and the like. Among them, particles of barium sulfate and titanium oxide are preferable from the viewpoint of particle diameter control and surface treatment. As barium sulfate particles, ground barite sulfate obtainable by grinding a barite mineral called a natural barite, and a so-called precipitated barium sulfate produced by a chemical reaction can be used. It is preferable to use the precipitated barium sulfate of which particle diameter is easily controlled. The type of titanium oxide may be any of anatase type, rutile type and brookite type.

For the surface treatment, a previously known method can be employed, and for example, a substance which can form a hydroxide and/or an oxide of one or both of Al and Si is added to an inorganic particle-containing solution slurry, and the mixture is heated. Examples of the hydroxide and/or oxide of one or both of Al and Si include oxides such as $SiO_2$ or $Al_2O_3$ and hydroxides such as $Al(OH)_3$ or $Si(OH)_4$.

Examples of the substance that can form a hydroxide and/or an oxide of one or both of Al and Si include sodium silicate, sodium aluminate and the like. When such a substance is used, an aqueous solution containing the substance maybe added dropwise to the inorganic particle-containing solution slurry. For example, a solution of a substance which can form a hydroxide and/or an oxide of one or both of Al and Si is added dropwise to an inorganic particle-containing solution slurry, and the mixture is heated (e.g. 40 to 100° C., preferably 50 to 90°C.), neutralized with an acid (e.g. dilute sulfuric acid), and dried, so that the hydroxide and/or oxide of one or both of Al and Si adheres to the surfaces of the inorganic particles.

Preferably, the inorganic particles are surface-treated with at least one selected from $SiO_2$ and $Al_2O_3$. More preferably, the inorganic particles are surface-treated with $SiO_2$ and $Al_2O_3$.

The adhering amount of the $SiO_2$ and $Al_2O_3$ is preferably 0.2% by mass or more and 5% by mass or less, more preferably 0.5% by mass or more and 4% by mass or less based on 100% by mass of the total of the inorganic particles and the surface treatment substance.

The adhering amount of Si and Al is preferably 0.5 to 50, more preferably 2 to 30 relative to 100 of barium elements at an element ratio detected by X-ray fluorescence analysis.

In the first embodiment of the present invention, the average particle diameter of the inorganic particles which is determined by the dynamic light scattering method is preferably 0.01 to 18 μm, more preferably 0.03 to 12 μm, preferably 0.05 to 8 μm, even more preferably 0.1 to 5 μm especially preferably 0.2 to 3 μm.

The average particle diameter of the inorganic particles is preferably smaller than the average particle diameter of the conductive particles. Specifically, the average particle diameter of the conductive particles is preferably 1.5 times or more, more preferably 2.0 times or more, still more preferably 2.4 times or more, especially preferably 4.0 times or more relative to the average particle diameter of the inorganic particles. The average particle diameter of the conductive particles may be 30 times or less the average particle diameter of the inorganic particles. When the average particle diameter of the inorganic particles is above the above-mentioned range, the irregularities on the surface of the resulting coat increase, which tends to cause a fracture of the coat when elongation occurs. On the other hand, when the average particle diameter of the inorganic particles is below the above-mentioned range, the stretching durability enhancement effect is insufficient, and the viscosity of the paste is increased, so that it is difficult to prepare the paste.

The inorganic particles are contained in an amount of preferably 2.0 to 30% by mass, more preferably 2.5 to 20% by mass, still more preferably 3.0 to 15% by mass, even more preferably 3.4 to 10% by mass based on 100% by mass of the total of the conductive particles and the inorganic particles. When the amount is above the above-mentioned range, there is the possibility that conductivity of the surface of the resulting coat is deteriorated, and stretchability is deteriorated. On the other hand, when the amount is below the above-mentioned range, isotropic conductivity is difficult to develop.

The aspect ratio of the inorganic particle is preferably less than 1.5, more preferably 1.4 or less, still more preferably 1.3 or less. When the aspect ratio is 1.5 or more, there is the possibility that the restoring force against stretching from the surface-treated inorganic particles is hardly isotropic, and isotropic conductivity is not exhibited. The lower limit of the aspect ratio may be, for example, about 1.0.

The inorganic particles that are used in the second embodiment of the present invention have an aspect ratio of less than 1.5, preferably 1.45 or less, more preferably 1.40 or less. When the aspect ratio is 1.5 or more, there is the possibility that the restoring force against twist is easily reduced, and an increase in change of specific resistance increases. The lower limit of the aspect ratio may be, for example, about 1.0.

Preferably, the inorganic particles are surface-treated with a hydroxide and/or an oxide of one or both of Al and Si. The inorganic particles contribute to improvement of dispersibility in a flexible resin, and contribute to twist resistance.

The inorganic particle may be one in which the aspect ratio falls within the above-mentioned range, and specifically, the inorganic particles exemplified in the first embodiment of the present invention can be used. Preferably, the inorganic particles are surface-treated with a hydroxide and/or an oxide of one or both of Al and Si as in the first embodiment of the present invention.

In the second embodiment of the present invention, the average particle diameter of the inorganic particles which is determined by the dynamic, light scattering method is preferably 0.01 to 12 μm, more preferably 0.03 to 10 μm, still more preferably 0.05 to 8 μm, even more preferably 0.1 to 5 μm, especially preferably 0.2 to 3 μm.

The average particle diameter of the inorganic particles is preferably smaller than the average particle diameter of the conductive particles as in the first embodiment of the present invention.

Preferably, the inorganic particles are contained in an amount falling within the same range as in the first embodiment of the present invention When the amount is smaller than the above-mentioned range, twist resistance is also difficult to develop.

In the third embodiment of the present invention, it is preferable that aggregated silver particles having an average particle diameter of 0.8 to 10 μm are used as the conductive particles, and inorganic particles having an aspect ratio of less than 1.5 and an average particle diameter of 0.5 times or less the average particle diameter of the aggregated silver particles are used.

That is, the inorganic particles that are used in the third embodiment of the present invention have an aspect ratio of preferably less than 1.5 as in the second embodiment of the present invention.

In the third embodiment of the present invention, the average particle diameter of the inorganic particles is preferably smaller than the average particle diameter of the aggregated silver particles for attaining particularly high compression resistance. Specifically, the average particle diameter of the inorganic particles is preferably 0.5 times or less, more preferably 0.45 times or less, still more preferably 0.40 times or less, especially preferably 0.35 times or less relative to the average particle diameter of the aggregated silver particles. The average particle diameter of the inorganic particles is preferably 0.10 times or more the average particle diameter of the aggregated silver particles. When the average particle diameter of the inorganic particles is above the above-mentioned range, the irregularities on the surface of the resulting coat increase, which tends to cause a fracture of the coat when elongation occurs. On the other hand, when the average particle diameter of the inorganic particles is below the above-mentioned range, the stretching durability enhancement effect is insufficient, and the viscosity of the paste may be increased to the extent that it is difficult to prepare the paste.

Preferably, the inorganic particles are contained in an amount within the same range as in the first embodiment of the present invention. When the amount is smaller than the above-mentioned range, compression resistance is difficult to develop.

Flexible Resin

Flexible resins that are used in the first to third embodiments of the present inventions are the same, and a flexible resin having a tensile elastic modulus of 1 MPa or more and 1000 MPa or less is used.

As the flexible resin in the present invention, thermoplastic resins, thermosetting resins, or rubbers having an (tensile) elastic modulus of 1 to 1000 MPa can be given. In order to develop the coat (Sheet) stretchability rubbers are preferable. Examples of the rubbers include urethane rubber, acrylic rubber, silicone rubber, butadiene rubber, rubber containing a nitrite group such as nitrite rubber or hydrogenated nitrite rubber, isoprene rubber, vulcanized rubber, styrene-butadiene rubber, butyl rubber, chlorosulfonated polyethylene rubber, ethylene propylene rubber, vinylidene fluoride copolymer, and the like. Among these, rubber containing a nitrite group, chloroprene rubber, chlorosulfonated polyethylene rubber, and styrene-butadiene rubber are preferable, and rubber containing a nitrile group or styrene-butadiene rubber is particularly preferable.

The (tensile) elastic modulus of the flexible resin is preferably within a range of 3 to 600 MPa, more preferably 10 to 500 MPa, still more preferably 15 to 300 even more preferably 20 to 150 MPa, and especially preferably 25 to 100 MPa.

There is no particular limitation for the rubber containing a nitrite group as far as it is a rubber or elastomer containing a nitrite group, and nitrite rubber and hydrogenated nitrile rubber are preferable. Nitrite rubber is a copolymer of butadiene with acrylonitrile, and when the amount of bonding acrylonitrile increases, affinity with metal increases but rubber elasticity contributing to stretchability rather decreases. Therefore, the amount of bonding acrylonitrile is preferably 18 to 50% by mass, and more preferably 40 to 50% by mass based on 100% by mass of the rubber containing a nitrile (the acrylonitrile butadiene copolymer rubber).

In the styrene-butadiene rubber, the content ratio of styrene and butadiene (styrene/butadiene) is preferably 70/30 to 30/70, more preferably 60/40 to 40/60 on a mass basis.

The alkali metal content of the flexible resin is preferably 4000 ppm or less, more preferably 2000 ppm or less, still more preferably 1000 ppm or less, even more preferably 500 ppm or less, especially preferably 100 ppm or less. By reducing the alkali metal content, a time-dependent increase in viscosity due quasi-crosslinking of a conductive particle paste (particularly an aggregated silver particle paste) is suppressed, so that long-term storage stability is improved. Due to reduction of the metal ion source, migration resistance in a conductive coat is also improved. Nitrile groups excellent in affinity for the conductive particles (particularly aggregated silver particles) are preferentially adsorbed to the surfaces of the conductive particles (particularly aggregated silver particles), so that the conductive particles (particularly aggregated silver particles) in the coat and rubber containing nitrile groups are not completely uniformly dispersed, and thus uneven distribution and nonuniformity as in a sea-island structure occur. Thus, a conductive network is easily formed although the filling amount of the conductive particles (particularly aggregated silver particles) is low. Since the amount of the rubber component increases due to reduction of the filling amount of the conductive particles (particularly aggregated silver particles), favorable elongation property and repeated stretchability can be developed.

The flexible resin is contained in an amount of preferably 7 to 35% by mass, more preferably 8 to 30% by mass, still more preferably 9 to 25% by mass, and even more preferably 10 to 22% by mass relative to the total amount of the conductive particles (particularly aggregated silver particles), the inorganic particles and the flexible resin. When the flexible resin is contained in a small amount, there is the possibility that the stretchability of the conductor sheet is deteriorated, and stretching durability is reduced. When the flexible resin is contained in a large amount, there is the possibility that conductivity is deteriorated, and isotropic conductivity and compression resistance are deteriorated.

As a method for producing the stretchable conductor sheet of the present invention, a method may be exemplified in which a composition (which does not include a solvent) for forming the stretchable conductor sheet is formed into a compound by melting and kneading the composition at a temperature at which a flexible resin component is sufficiently softened, and the compound into a film by a melt extruder. Preferably, the method is used when high productivity is required.

As a method fix producing the stretchable conductor sheet of the present invention, a method may be exemplified in which a material for forming the stretchable conductor sheet is further blended with a solvent in which a flexible resin component can be dissolved and dispersed, the mixture is processed into a slurry or paste, and the slurry or paste is then applied to a support, and dried to form a sheet.

One aspect of the first embodiment of the present invention encompasses a paste for forming a stretchable conductor sheet, which is used for producing a stretchable conductor sheet, the paste including at least conductive particles, inorganic particles surface-treated with a hydroxide and/or an oxide of one or both of Al and Si, a flexible resin having a tensile elastic modulus of 1 MPa or more and 1000 MPa or less, and a solvent. The inorganic particles are contained in an amount of 2.0 to 30% by mass based on 100% by mass of a total of the conductive particles and the inorganic particles, and the flexible resin is contained in an amount of 7 to 35% by mass based on 100% by mass of a total of the conductive particles, the inorganic particles and the flexible resin.

One aspect of the second embodiment of the present invention encompasses a paste for forming a stretchable conductor sheet, which is used for producing a stretchable conductor sheet, the paste including at least conductive particles, inorganic particles having an aspect ratio of less than 1.5, a flexible resin having a tensile elastic modulus of 1 MPa or more and 1000 MPa or less, and a solvent. The inorganic particles are contained in an amount of 2.0 to 30% by mass based on 100% by mass of a total of the conductive particles and the inorganic particles, and the flexible resin is contained in an amount of 7 to 35% by mass based on 100% by mass of a total of the conductive particles, the inorganic particles and the flexible resin.

One aspect of the third embodiment of the present invention encompasses a paste for forming a stretchable conductor sheet, which is used for producing a stretchable conductor sheet, the paste including at least conductive particles, a flexible resin having a tensile elastic modulus of 1 MPa or more and 1000 MPa or less, and a solvent. The flexible resin is contained in an amount of 7 to 35% by mass based on 100% by mass of a total of the aggregated silver particles and the flexible resin. Particularly preferable is a paste for forming a stretchable conductor sheet, which is used for producing a stretchable concluder sheet, the paste including at least aggregated silver particles having an average particle diameter of 0.8 to 10 μm, inorganic particles having an aspect ratio of less than 1.5 and an average particle diameter of 0.5 times or less the average particle diameter of the aggregated silver particles, a flexible resin having a tensile elastic modulus of 1 MPa or more and 1000 MPa or less, and a solvent. The inorganic particles are contained in an amount of 2.0 to 30% by mass based on 100% by mass of a total of the aggregated silver particles and the inorganic particles, and the flexible resin is contained in an amount of 7 to 35% by mass based on 100% by mass of a total of the aggregated silver particles, the inorganic particles and the flexible resin.

The conductive particles (particularly aggregated silver particles) are contained in an amount of preferably 30 to 80% by mass, more preferably 35 to 75% by mass, still more preferably 40 to 70% by mass based on 100% by mass of the paste for forming a stretchable conductor sheet. When the content ratio of the conductive particles (particularly aggregated silver particles) is less than 30% by mass, there is the possibility that sufficient conductivity cannot be secured. On the other hand, when the content ratio of the conductive particles (particularly aggregated silver particles) is more than 80% by mass, it is difficult to secure stretchability and twist resistance. Preferably, the inorganic particles and the flexible resin are contained in the same amount as described above.

The paste for forming a stretchable conductor sheet according to the present invention contains a solvent. The solvent in the present invention is preferably water or an organic solvent.

The content of the solvent is not particularly limited because it should be appropriately adjusted according to a viscosity required for the paste, and the content of the solvent is preferably 20 to 60% by mass, more preferably 22 to 50% by mass, still more preferably 24 to 40% by mass based on 100% by mass of the total of the conductive particles (particularly aggregated silver particles), the inorganic particles, the flexible resin and the solvent.

The boiling point of the organic solvent is preferred to be equal to or higher than 100° C. and lower than 300° C., and more preferred to be equal to or higher than 130° C. and lower than 280° C. When the boiling point of the organic solvent is too low the solvent may be evaporated airing the paste production process and during use of the paste, and there is concern that the ratio of the ingredients constituting the conductive paste will be apt to change. On the other hand, when the boiling point of the organic solvent is too high, the amount of solvent remaining in the dried and cured coat becomes large, and hence there is concern that reliability of the coat will deteriorate.

Examples of the organic solvent include ester-based solvents, ether-based solvents, ether ester-based solvents, ketone-based solvents, alcohol-based solvents and aromatic hydrocarbon-based solvents.

Examples of the ester-based solvent include γ-butyrolactone, 2,2,4-trimethyl-1,3-pentanediol monoisobutyrate the like.

Examples of the ether-based solvent include diethylene glycol, triethylene glycol, triethylene glycol monomethyl ether, triethylene glycol monoethyl ether, triethylene glycol monobutyl ether, tetraethylene glycol, tetraethylene glycol monobutyl ether, tripropylene glycol, tripropylene glycol monomethyl ether and the like.

Examples of the ether ester-based solvent include propylene glycol monomethyl ether acetate, butyl glycol acetate, ethylene glycol monoethyl ether acetate, diethylene glycol monoethyl ether acetate, diethylene glycol monobutyl ether acetate, diethylene glycol monoacetate, triethylene glycol diacetate and the like.

Examples of the ketone-based solvent include cyclohexanone, isophorone and the like.

Examples of the alcohol-based solvent include benzyl alcohol, terpineol, n-dodecanol and the like.

Examples of the aromatic hydrocarbon-based solvent include toluene, xylene, Solvesso 100, 150 and 200 manufactured by Exxon Chemical Corporation, diamyl benzene, triamyl benzene and the like.

Examples of petroleum hydrocarbons include AF Solvents No. 4 (boiling point 240 to 265° C.), No. 5 (boiling point: 275 to 306° C.), No. 6 (boiling point: 296 to 317° C.), No. 7 (boiling point: 259 to 282° C.), No. 0 Solvent H (boiling point: 245 to 265° C.) and the like manufactured by Nippon Oil Corporation, and the paste may contain two or more thereof as necessary.

Such an organic solvent is appropriately contained so that the paste for forming a stretchable conductor sheet has a viscosity suitable for printing or the like. Among them, isophorone is preferable because the organic solvent is hardly volatilized during preparation of the paste, and the organic solvent is sufficiently volatilized during application of the paste.

In addition, an epoxy resin can be blended in the paste for forming a stretchable conductor sheet according to the present invention. The epoxy resin in the present invention is preferably a bisphenol A-type epoxy resin and a phenol novolak-type epoxy resin.

When an epoxy resin is blended, a curing agent for the epoxy resin can be blended. As the curing agent, a known amine compound, polyamine compound or the like may be used. The curing agent is contained in an amount of preferably 1 to 30 parts by mass, more preferably 2 to 15 parts by mass based on 100 parts by mass of the epoxy resin. The epoxy resin and the curing agent are contained in an amount of preferably 0.5 to 30 parts by mass, more preferably 1.0 to 20 parts by mass, still more preferably 1.5 to 15 parts by mass based on 100 parts by mass of the flexible resin.

From the viewpoint of imparting to printability and adjusting the color tone, the paste for forming a stretchable conductor sheet according to the present invention may contain known organic and inorganic additives such as a leveling agent, an antioxidant and an ultraviolet absorber as long as the effect of the present invention is not impaired.

The paste for forming a stretchable conductor sheet can be prepared by further blending a solvent with the conductive particles (particularly aggregated silver particles), the inorganic particles and the flexible resin and mixing and dispersing the mixture with a disperser such as a dissolver, three-roll mill, rotation/revolution mixer, attritor, ball mill or sand mill to form the resin composition into a paste.

In one aspect of the present invention, a stretchable conductor sheet can be obtained by a solution film formation method in which the thus-obtained paste for forming a stretchable conductor sheet is applied to a substrate, preferably a substrate having release property, by a technique of a die coater, a squeegee coater, an applicator, a comma coater, screen printing or the like (preferably an applicator or a comma coater), and dried to form a sheet. This method is applicable to low-amount production, and also is a preferable method when a sheet with a relatively small thickness is required.

For applying the paste to a substrate, and volatilizing the solvent to dry the paste, heating may be performed for a predetermined time in, for example, an atmosphere, a vacuum atmosphere, an inert gas atmosphere, as reducing gas atmosphere or the like. The heating temperature is, for example, 100 to 150° C., preferably 110 to 130° C. The heating time is, for example, 10 to 40 minutes, preferably about 20 to 30 minutes.

In the first and second embodiments of the present invention, the thickness of the stretchable conductor sheet obtained from a paste is 3 to 800 μm, preferably 8 to 500 μm, more preferably 12 to 300 μm, still more preferably 20 to 180 μm. In the third embodiment of the present invention, the thickness of the stretchable conductor sheet obtained from a paste is preferably 3 to 800 μm, more preferably 8 to 500 μm, still more preferably 12 to 300 μm, especially preferably 20 to 180 μm. When the thickness of the sheet is less than 3 μm, there is the possibility that durability against stretching is reduced, and conductivity is deteriorated. When the thickness of the sheet is more than 800 μm, there is the possibility that it is difficult to obtain sufficient stretchability, and a sufficient fit feeling cannot be obtained when the sheet is used for a fabric.

The stretchable conductor sheet of the present invention can be formed from only a paste for forming a paste for forming a stretchable conductor sheet (a conductive layer can be formed), with an insulating layer provided on at least one surface as necessary. Similar to the stretchable conductor sheet, it is preferable that the insulating layer have stretchability. As a material of the insulating layer, a polymer material having a low elastic modulus is preferably used similar to the flexible resin constituting the paste for forming a stretchable conductor sheet. When the stretchable conductor sheet is used as an electrical wiring, this insulating layer functions as an insulating layer between the stretchable conductor sheet and the substrate or an adhesive layer to the substrate. When the insulating layer is provided on a side opposite to the substrate when the sheet is used as an electrical wiring, i.e. on the surface side, the insulating layer functions as an insulating coating layer (insulating portion).

The resin constituting the insulating layer is not particularly limited as long as it exhibits an insulating property, and examples thereof include polyurethane-based resins, silicone-based resins, vinyl chloride-based resins, epoxy resins and the like. Among them, polyurethane-based resins are preferable from the viewpoint of adhesiveness to the conductive layer.

The polyurethane-based resin is preferably, for example, a polyester-based polyurethane resin, a polyether-based polyurethane resin, a polycarbonate-based polyurethane resin or the like, and a polyester-based polyurethane resin is more preferable from the viewpoint of the stretchability of the coat.

The insulating layer may be prepared by dissolving or dispersing a resin in a solvent (preferably water), coating or printing a substrate or a raw fabric with the resulting solution or dispersion onto to form a coat, and then drying the coat by volatilizing the solvent contained in the coat. Here, the viscosity of the resin solution may be 400 MPa·s or less, and a thickener such as acryl-based polymer may be used as a viscosity adjusting agent.

The thickness of the insulating layer is, for example, 5 to 200 μm, preferably 8 to 150 μm, more preferably 14 to 90 μm still more preferably 20 to 70 μm. When the insulating layer is excessively thin, the insulating effect is insufficient, and when the insulating layer is excessively thick, there is the possibility that the stretchability of the fabric or the like is impaired, or wearing comfortableness is impaired.

Normally, a portion of the insulating layer thrilled on the raw fabric enters the raw fabric, but the above-mentioned thickness may be a thickness including the thickness of the portion entering the raw fabric. The thickness of the insulating layer excluding the entering portion is, for example, 5 to 200 μm, preferably 8 to 150 μm, more preferably 14 to 90 μm, still more preferably 20 to 70 μm.

The stretchable conductor sheet of the present invention can be formed with another conductor layer provided on at least one surface as necessary, the conductor layer including carbon as a conductive filler. Such a form is preferable particularly when the conductive particles used for the paste for forming a stretchable conductor sheet are metal particles. Similarly the resin material constituting the conductor composition containing carbon as a conductive filler is preferably a polymer material having a low elastic modulus. Such a conductor composition layer containing carbon as a conductive filler functions as a contact material when the paste for forming a stretchable conductor sheet is used as an electrode portion.

A method for forming the insulating layer and/or the conductor composition layer containing carbon as a conductive filler on one or both surfaces of the stretchable conductor sheet will be described below.

When a melt-molding method is employed as a method for producing a sheet, melt-molding may be repeatedly performed to sequentially stack sheets. Alternatively, it is also possible to simultaneously extrude a plurality of layers by using a two-layer die or a three-layer die to form into a sheet.

When a solution film formation method is employed, likewise, coating, drying and curing of the solution may be repeatedly performed to sequentially stack sheets. For example, a sheet can be stacked by a solution film formation method on a sheet formed by a melt-extrusion method, or reversely, a sheet may be stacked by a melt-extrusion method on a sheet formed by a solution film formation method. As a special case of the solution film formation method, a sheet having a multilayer structure can also be obtained by sequentially performing overprinting by a screen printing method or the like.

In the present invention, an insulating layer and/or a layer of a conductor composition containing carbon as a conductive filler can be formed in a predetermined pattern shape by a printing method such as a screen printing, stencil printing, or ink jet printing on a sheet formed by a melt-extrusion method or a solution film formation method. In this case, the insulating layer may function as an adhesive layer.

In the present invention, a stretchable conductor sheet, an insulating layer sheet, an adhesive sheet, a conductor composition sheet containing carbon as a conductive filler, and the like can be separately formed into a sheet, laminated and then used. For laminating, a known adhesive or hot-melt resin may be used. In addition, when each sheet maintains thermoplastic properties, it is possible to fuse and bond the sheets together.

Further, in the present invention, the stretchable conductor resin sheet alone, preferably a sheet having the insulating layer and/or the layer of the stretchable conductor composition containing carbon as a conductive filler on at least one surface of the sheet is processed into a predetermined shape, and the processed sheet is attached to a garment or fabric that is raw fabric of a garment to form an electrical wiring.

A known adhesive or hot-melt type resin may be used for the attachment of the sheet to the fabric. Preferably, a material used for the attachment has flexibility. The insulating layer sheet may be turned to a B-stage state, which is a semi-dried and semi-cured state, and the insulating layer sheet itself may be used as a hot-melt material. In addition, the stretchable conductor sheet may be turned to a B-stage state and attached to the fabric by applying heat/pressure.

In the present invention, a fabric including a stretchable conductor sheet and having an electrical wiring can be produced by directly printing an electrical wiring pattern on the fabric using the paste for forming a stretchable conductor sheet (see FIG. 1). The production method may include a step (A) of preparing a temporary support 2; a step (B) of fixing a fabric 1 on the temporary support 2; a step (C) of forming a stretchable conductor sheet 3 by performing printing on the fabric 1 using a paste for forming a stretchable conductor sheet 3; a step (D) of forming the stretchable cover 4 (insulating portion) on the stretchable conductor sheet 3, and partially exposing the stretchable conductor sheet 3; a step (E) of forming stretchable carbon 5 (electrode portion) on the exposed stretchable conductor sheet 3; and a step (F) of separating the resulting laminate from the temporary support 2.

As a printing method, a screen printing method, a lithographic offset printing method, a paste jet method, a flexographic printing method, a gravure printing method, a gravure offset printing method, a stamping method, a stencil method or the like can be used, and in the present invention, it is preferable to use a screen printing method or a stencil method. In addition, a method in which a wiring is directly drawn using a dispenser or the like may be considered as printing in the broad sense.

In printing a predetermined pattern may be printed on a fabric such as a woven fabric, a knitted fabric, a nonwoven fabric or a synthetic leather, which is a raw fabric of a garment or textile product, followed by cutting and sewing the fabric to obtain a textile product such as a garment. Alternatively, the pattern can be printed on a sewn textile product or a sewing intermediate.

In addition, a flexible resin material such as a polyurethane resin or rubber can be applied on the whole or a part of a fabric as a base, followed by performing printing using the paste for forming a stretchable conductor sheet. In addition, the fabric may be temporarily fixed with a water-soluble resin or the like to facilitate handling, followed by performing printing using the paste. In addition, the fabric may be temporarily fixed to a hard plate material, followed by performing printing using the poste. In a garment with a wiring which is obtained by performing printing directly on a fabric using the paste for forming a stretchable conductor sheet, the base and/or the stretchable conductor portion, and the fiber of the fabric that is a substrate partially enter each other, so that firm bonding can be attained. Even when printing is performed via an underlayer, a material having favorable adhesiveness with the paste for forming a stretchable conductor sheet can be appropriately selected fix in the underlayer and therefore it is possible to obtain a garment having an electrical wiring layer having favorable adhesiveness.

The wiring composed of the stretchable conductor sheet of the present invention can be provided with a stretchable insulating cover coat by a printing method or a lamination method as necessary. In addition, an electrode surface supposed to come into contact with a human body surface can be provided with a surface layer including a composition containing carbon particles as a main body of a conductive filler as conductive particles. The composition containing carbon particles as a main body of a conductive filler is preferably one obtained from a carbon paste containing as a binder a flexible resin identical to that in the stretchable conductor sheet of the present invention. In addition, a portion to be used as an electrical contact with a discrete component can be plated with gold, tin or the like.

In the present invention, a fabric having a stretchable wiring can be produced by printing an electrical wiring pattern on an intermediate medium using the above-described paste for forming a stretchable conductor sheet described above, and then transferring the pattern to the fabric (see FIG. 2). The production method may include a step (A) of preparing a release support 6; a step (B) of partially forming stretchable carbon 5 (electrode portion) on the release support 6; a step (C) of forming a stretchable cover 4 (insulating portion) on the release support 6 and on a portion other than the stretchable carbon 5 (electrode portion); a step (D) of forming a stretchable conductor sheet 3 by performing printing using a paste for forming a stretchable conductor sheet 3 on the stretchable carbon 5 (electrode portion) and the stretchable cover 4 (insulating portion); a step (E) of applying an adhesive 7 onto the stretchable conductor sheet 3 and an end portion of the stretchable cover 4 (insulating portion); and a step (F) of transferring the resulting laminate to a fabric 1; and a step (G) of removing the release support 6.

Here, the same printing method as direct printing can be appropriately selected. Similarly, a cover coat layer, a composition layer containing carbon particles as a main body of a conductive filler, and the like can be provided. When a transfer method is used, the stretchable conductor sheet of the present invention can be transferred by thermocompression-bonding the sheet to the fabric because it has thermoplasticity. In addition, when easy transfer property is required, a hot melt layer as an underlayer can be formed on a wiring pattern printed on an intermediate medium beforehand, followed by transferring the layer to the fabric. Further, a hot melt layer may be provided as an image receiving layer on the fabric side beforehand. For the hot melt layer, a thermoplastic urethane resin or the same flexible resin as the binder component of the paste for forming a stretchable conductor sheet according to the present invention can be used.

For the intermediate medium here, a so-called release sheet such as a polymer film or paper having a release layer on a surface may be used. In addition, a film, sheet, plate or the like having a surface composed of a hardly adhesive material such as a fluoro resin, a silicone resin or a polyimide can be used. It is also possible to use a metal plate such as a stainless steel, hard chromium-plated steel plate or an aluminum plate.

Preferably, the component constituting the stretchable cover contains, for example, a flexible resin, an epoxy resin, a curing agent and a solvent from the viewpoint of exhibiting stretchability similar to that of the stretchable conductor sheet. The stretchable cover forms an insulating portion for the stretchable conductor sheet.

Preferably, the component constituting the stretchable carbon contains a flexible resin, conductive carbon and a solvent from the viewpoint of exhibiting stretchability similar to that of the stretchable conductor sheet and the stretchable cover. Examples of the conductive carbon include Ketjen carbon and nanocarbon tubes. The stretchable carbon forms the electrode portion of the stretchable conductor sheet.

The isotropic conductivity of the stretchable conductor sheet of the first embodiment of the present invention can be evaluated as follows. That is, the application direction of the paste for forming a stretchable conductor sheet is defined as A, the direction perpendicular to the application direction is defined as B, a test piece is prepared by cutting the resulting stretchable conductor sheet into a predetermined sample (having a width of 20 mm and a length of 50 mm), the specific resistance of the test piece at an elongation ratio of 40% is measured, and the specific resistance change ratio (also referred to as an isotropic property or a specific resistance change ratio at an elongation ratio of 40% in this specification) of the test piece in each of the application direction (A) and the direction (B) perpendicular to the application direction is determined from the following equation.

isotropic property (%)={(specific resistance in application direction/specific resistance in direction perpendicular to application direction)−1}×100

The elongation ratio of the stretchable conductor sheet can be calculated from the following equation. L0 denotes a distance between the gauge lines of the test piece, and ΔL0 denotes an increase in distance between the gauge lines of the test piece. For the sheet resistance at the time of elongation, a value is read 30 seconds after reaching a predetermined elongation degree.

elongation ratio (%)=(ΔL0/L0)×100

The specific resistance of the stretchable conductor sheet may be measured as follows. The thickness is measured using Thickness Gauge SMD-565L (manufactured by TECLOCK Co., Ltd.), and the sheet resistance is measured by Loresta-GP MCP-T610 (manufactured by Mitsubishi Chemical Analytech Co., Ltd.) for four test pieces. Using the average value of the sheet resistances, the specific resistance can be calculated from the following equation. Rs denotes a sheet resistance measured under each condition, and t denotes a measured thickness.

specific resistance (Ωcm)=Rs (Ω/□)×t (cm)

In the first embodiment of the present invention, the isotropic properly is evaluated by the specific resistance at the time of elongation by 40% in the application direction and the specific resistance at the tune of elongation by 40% in the direction perpendicular to the application direction. That is, in each of the two orthogonal directions, the specific resistance change ratio at the time of elongation by 40% with respect to the original length is less than ±10%, preferably ±9.0% or less, more preferably ±8.0% or less, still more preferably ±7.5% or less in the elongation direction.

The twist resistance of the stretchable conductor sheet of the second embodiment of the present invention can be evaluated on the basis of a change in specific resistance after a twist cycle in a twist test is repeated 100 times. In the twist test, a sample having a width of 10 mm and a length of 100 mm is used (the sample is twisted with the sample fixed at one end in the longitudinal direction and turned at the other end), and in the twist cycle, the sample is twisted by 10 turns in the positive direction (3600°), and returned to an initial state, twisted by 10 turns in the negative direction (−3600°), and returned to the initial state.

The specific resistance of the stretchable conductor sheet can be calculated under the same conditions as in the first embodiment of the present invention.

In the second embodiment of the present invention, the specific resistance of the stretchable conductor sheet after the twist cycle in the twist test is repeated 100 times (hereinafter, sometimes referred to as a change in specific resistance after twist test) is 3.0 times or less, preferably 2.8 times or less, more preferably 2.6 times or less, still more preferably 2.4 times or less, even more preferably 2.2 times or less, especially preferably 2.0 times or less the initial specific resistance.

In the third embodiment of the present invention, the void ratio of the stretchable conductor sheet is 10% by volume or more and 50% by volume or less, preferably 15% by volume or more and 50% by volume or less, more preferably 15% by volume or more and 48% by volume or less, still more preferably 16% by volume or more and 46% by volume or less. When the void ratio is low, there is the possibility that washing durability is reduced. On the other hand, when the void ratio is high, there is the possibility that stretchability and conductivity are deteriorated.

The void ratio of the stretchable conductor sheet can be calculated from an apparent specific gravity and a real specific gravity determined from a charge ratio.

The compression resistance of the stretchable conductor sheet of the third embodiment of the present invention can be evaluated on the basis of a change in specific resistance after compression by 10% is repeated 100 times (hereinafter, sometimes referred to as a change in specific resistance after compression test).

change in specific resistance (times)=specific resistance of stretchable conductor sheet after compression by 10% is repeated 100 times/specific resistance of stretchable conductor sheet in initial state The specific resistance of the stretchable conductor sheet can be calculated under the same conditions as in the first embodiment of the present invention.

In the third embodiment of the present invention, the specific resistance of the stretchable conductor sheet after compression by 10% is repeated 100 times is preferably 2.4 times or less, more preferably 2.2 times or less, still more preferably 2.0 times or less, especially preferably 1.8 times or less the initial specific resistance. It can be said that when the change in specific resistance after compression is within the above-mentioned range, the stretchable conductor sheet of the present invention has sufficient compression resistance.

When the stretchable conductor sheet of the third embodiment of the present invention is subjected to washing, the change in specific resistance after washing in the stretchable conductor sheet is small, so that excellent washing durability is exhibited. For example, the specific resistance of the stretchable conductor sheet after washing and the initial specific resistance of the stretchable conductor sheet are calculated in accordance with JIS L0844 for washing conditions, and on the basis of a ratio of these specific ratios (specific resistance of stretchable conductor sheet after washing/initial specific resistance of stretchable conductor sheet), washing durability is evaluated. Specifically, washing durability may be evaluated on the basis of a ratio of the specific resistance of the stretchable conductor sheet after a cycle in which the sheet is continuously washed five times using a mechanical washer and a washing net, and then dried in the shade once is repeated 10 times and the specific resistance of the stretchable conductor sheet in an initial state before washing (hereinafter, sometimes referred to as a change washing durability specific resistance).

In the third embodiment of the present invention, the specific resistance of the stretchable conductor sheet after the cycle in which the sheet is continuously washed five times, and dried in the shade once is repeated 10 times is preferably 4.0 times or less, more preferably 3.5 times or less, still more preferably 3.0 times or less, even more preferably 2.5 times or less the initial specific resistance. It can be said that when the specific resistance after washing is within the above-mentioned range, the stretchable conductor sheet of the present invention has sufficient washing durability.

The present application claims benefit of priority based Japanese Patent Application No. 2016-46136, Japanese Patent Application No. 2016-46137 and Japanese Patent Application No. 2016-46138 filed on Mar. 9, 2016. The descriptions of Japanese Patent Application No. 2016-46136, Japanese Patent Application No. 2016-46137 and Japanese Patent Application No. 2016-46138 are incorporated herein by reference in their entirety.

EXAMPLES

Hereinafter, the invention will be explained in more detail and specifically by further showing examples. Evaluation results etc. of examples were measured by the following method.

Amount of Nitrile

The amount of nitrile was converted from the composition ratio obtained by analyzing the resulting flexible resin material by NMR to a ratio by mass (% by mass) of monomer.

Mooney Viscosity

The measurement was conducted using SMV-300RT "Mooney Viscometer" manufactured by Shimadzu Corporation.

Amount of Alkali Metal

The resin was subjected to an ashing treatment, the resulting ash was extracted by means of hydrochloric acid, the contents of sodium and potassium were determined by atomic absorption spectrometry, and both contents were summed.

Elastic Modulus

The flexible resin was heated, compressed and molded into a sheet having a thickness of 200 ±20 μm, and then punched out into a dumbbell shape defined by ISO 527-2-1A to obtain a test piece. A tensile test was performed by the method defined in ISO 527-1 to determine an elastic modulus.

Average Particle Diameter

The measurement was performed using a light-scattering particle size distribution analyzer LB-500 manufactured by Horiba, Ltd.

Analysis of Composition of Inorganic Particle

Using a fluorescent X-ray analyzer (Fluorescent X-Ray Analyzer System 3270 manufactured by Rigaku Denki Co., Ltd), the composition of the inorganic particle was analyzed to measure the amounts of the Al component and the Si component. For the adhering amounts of the Al component and the Si component, the amount of the metal compound in each of the detected Al component and Si component is shown in terms of an oxide (i.e. in terms of $Al_2O_3$ for the Al and $SiO_2$ for the Si component).

Evaluation of Specific Resistance

A stretchable conductor sheet was cut into a width of 10 mm and a length of 140 mm to prepare a test piece. The sheet resistance and the thickness of the stretchable conductor sheet test piece in a natural state (elongation ratio: 0%) were measured, and the specific resistance was calculated. The thickness was measured using Thickness Gauge SMD-565L (manufactured by TECLOCK Co., Ltd.), and the sheet resistance was measured by Loresta-GP MCP-T610 (manufactured by Mitsubishi Chemical Analytech Co., Ltd.) for four test pieces. The average value of the sheet resistances was used. The specific resistance was calculated from the following equation. Here, Rs denotes a sheet resistance measured under each condition, and t denotes a thickness measured under each condition.

specific resistance (Ωcm)=Rs (Ω□)×$t$ (cm)

In the same manner as in the ease of the natural state (elongation ratio: 0%), the specific resistance at the time of elongation by 40% (elongation rate: 60 mm/min) was measured using a universal testing machine (Autograph AG-IS manufactured by Shimadzu Corporation). In addition, as reference data, the specific resistance at the time of elongation by 20% (elongation rate: 60 mm/min) was measured.

The elongation ratio was calculated from the following equation. L0 denotes a distance between the gauge lines of the test piece, and ΔL0 denotes an increase in distance between the gauge lines of the test piece. For the sheet resistance at the time of elongation, a value is read 30 seconds after reaching a predetermined elongation degree.

elongation ratio (%)=(ΔL0/L0)×100

Evaluation of elongation of the conductive film was performed in two elongation directions: a test piece elongation direction as a direction in winch the conductive paste is applied (described as "specific resistance at the time of elongation in application direction" in the table) and a test piece elongation direction as a direction orthogonal to the application direction (described as "specific resistance at the time of orthogonal elongation in application direction" in the table).

Evaluation of Isotropic Property

A sample piece was prepared by cutting the sheet into a width of 20 mm and a length of 50 mm in each of the application direction of the paste for forming a stretchable conductor sheet and the direction perpendicular to the application direction. Using each test piece, the specific resistance at an elongation of 40% was measured. The specific resistance change ratios of the test piece in the application direction and in the direction perpendicular to the application direction (each described as "specific resistance change ratio at the time of elongation by 40%" in the table) were compared to each other to evaluate the isotropic property.

isotropic property (%)={(specific resistance in application direction/specific resistance in direction perpendicular to application direction)−1}×100

Evaluation of Twist Properly

The specific resistance of the stretchable conductor sheet in the initial state and the specific resistance of the stretchable conductor sheet after a twist cycle in a twist test was repeated 100 times were calculated, and a change in specific resistance (described as "change in specific resistance after twist test" in the table) was calculated frons the following equation. In the twist test, a test piece having a width of 10 mm and a test length of 100 mm is used as a sample (a twist is applied with the sample fixed at one end in the longitudinal direction and turned at the other end), and in the twist cycle, the sample is twisted by 10 turns in the positive direction (3600°), and returned to an initial state, twisted by 10 turns in the negative direction (−3600°), and returned to the initial state.

change in specific resistance (times)=specific resistance of stretchable conductor sheet after twist cycle is repeated 100 times/specific resistance of stretchable conductor sheet in initial state

Void Ratio

The void ratio of the stretchable conductor sheet was calculated from an apparent specific gravity and a real specific gravity determined from a charge ratio. FIG. 3 shows a picture obtained by photographing a cross-section along the thickness direction at a magnification of 1000 times with a scanning electron microscope for the sheet of Example 31 shown in Table 4-3 below.

Evaluation of Compression Resistance

A release PET film was squeegee-coated with the paste for forming a stretchable conductor sheet, and the paste was dried and cured under predetermined conditions to obtain a stretchable conductor sheet having a thickness of 100 μm. The obtained stretchable conductor sheet was punched into a circle with a diameter of 50 mm, and 10 sheets were laid over one another and used as samples. The specific resistances of 10 samples were measured at the central part of each of the test pieces, and the average value of the specific resistances was determined. This was defined as a specific resistance (initial specific resistance) ρi before test.

Next, the following compression operation was performed. For the compression operation a universal testing machine manufactured by Shimadzu Corporation was used. A fixed thick plate was situated on the lower side, a sample was placed on the thick plate, a metal cylinder having a flat bottom surface and having a diameter of 20 mm and a height of 10 mm was placed on the sample, a spherical thick plate was put over the top, and a cycle of compressing the sample by 10% and releasing the sample was repeated 100 times (1 cycle/second). The specific resistances of the sheets (10 sheets) of the sample at the central part after completion of the compression operation were measured, and the average value of the specific resistances was determined. The average value was defined as a specific resistance ρe after 100 compression tests.

On the basis of ρi and ρe, a change in specific resistance after compression test was determined from the following equation, and compression resistance was evaluated.

specific resistance change (times)=ρe/ρi

Washing Durability

Washing was performed in accordance with JIS L 0844 for washing conditions. Specifically, a cycle in which the sheet is continuously washed five times using a mechanical washer, a washing net and a detergent (Attack manufactured by Kao Corporation), and then dried in the shade once was repeated 10 times. The specific resistance of the stretchable conductor sheet after washing 50 times was measured, a change from the initial specific resistance (specific resistance after washing/initial specific resistance) was determined, and washing durability was evaluated.

In this example, R1 to R3 shown in Table 1 below were used as flexible resins.

Production Example

Polymerization of Flexible Resins (Synthetic Rubber Material)

Butadiene 54 parts by mass, acrylonitrile 46 parts by mass, deionized water 270 parts by mass, sodium dodecylbenzenesulfonate 0.5 part by mass, sodium naphthalenesulfonate condensate 2.5 parts by mass, t-dodecyl mercaptan 0.3 part by mass, triethanolamine 0.2 part by mass, and sodium carbonate 0.1 part by mass were put into a stainless steel reactor equipped with a stirrer and a water cooling jacket and gently stirred while keeping the bath temperature at 15° C. by flowing nitrogen. Next, an aqueous solution prepared by dissolving 0.3 part by mass of potassium persulfate in 19.7 parts by mass of deionized water was added dropwise into the reactor over 30 minutes, reaction was further continued for 20 hours, an aqueous solution prepared by dissolving 0.5 part by mass of hydroquinone in 19.5 parts by mass of deionized water was then added thereto, and an operation for stopping the polymerization reaction was carried out. The polymerization temperature was 15 °C.

Next, in order to distill off unreacted monomers, the pressure in the reactor was first reduced, and then steam was introduced into the reactor to recover the unreacted monomers, thereby to obtain a synthetic rubber latex (L1) composed of NBR. Sodium chloride and dilute sulfuric acid were added to the obtained latex, aggregation and filtration were performed. Then, deionized water in an amount 20 times in volume ratio to the resin was divided in five portions, the resin was washed by repeating redispersion in the deionized water and filtration, and dried in air to obtain a flexible resin (a synthetic rubber resin) (R1).

The evaluation results of the obtained the flexible resin (the synthetic rubber resin) (R1 are shown in Table 1. Then, the operations were similarly performed by changing raw materials, polymerization conditions, washing conditions, and the like to obtain flexible resins (R2) and (R3) shown in Table 1. Abbreviations in the table are as follows:
NBR: acrylonitrile butadiene rubber
SBR: styrene-butadiene rubber (styrene/butadiene=50/50% by mass)

TABLE 1

| Latex | L1 | L2 | L3 |
|---|---|---|---|
| Stretchable resin | R1 | R2 | R3 |
| Component | NBR | NBR | SBR |
| Polymerization temperature | 15 | 12 | 20 |
| Amount of nitrile (% by mass) | 43 | 35 | 0 |
| Alkali metal content (ppm) | 42 | 62 | 53 |
| Mooney viscosity | 53 | 42 | 64 |
| Elastic modulus (MPa) | 31 | 25 | 63 |

In this example, P1 to P4 shown in Table 2 below were used as inorganic particles.

Inorganic Particles P1 (Barium Sulfate Particles)

As inorganic particles P1, barium sulfate particles surface-treated with $SiO_2$ and $Al_2O_3$ were prepared in accordance with the following procedure. A Warman pump having a suction port diameter of 40 mm, a discharge port diameter of 25 mm, an inner volume of 850 mL and an impeller rotation speed of 2380 rpm was used as a reaction tank. 1000 mL of an aqueous slurry (solid content: 95 g/L) prepared by causing the pump to suck a sulfuric acid aqueous solution having a concentration of 110 g/L (1.1 mol/L) and having a temperature of 30° C. at a constant flow rate of 700 L/h and suck a barium sulfate aqueous solution having a concentration of 120 g/L (0.71 mol/L) and having a temperature of 50° C. at a constant flow rate of 600 L/h was heated to 60° C. Sodium silicate in an amount of 4.0 g in terms of $SiO_2$ was diluted with 100 mL of pure water, and added dropwise over 20 minutes, and sodium aluminate in an amount equivalent of 2.0 g in terms of $Al_2O_3$ was diluted with 100 mL of pure water, and added dropwise over 20 minutes. Further the reaction system was heated to 70° C., stirred for 30 minutes, and neutralized to a pH of 8 over 30 minutes using dilute sulfuric acid. The reaction system was stirred for 10 minutes, then filtered, thoroughly washed with water, and dried to obtain a dry chip, and the chip was crushed, and then ground by an airflow-type grinder. In the obtained powder, 3.5% by mass of $SiO_2$ and 1.7% by mass of $Al_2O_3$ were adhered based on 100% by mass of the total of the barium sulfate particles as a substrate and the adherend. The average particle diameter measured by a dynamic light scattering method was 0.3 μm. The aspect ratio was 1.3.

Inorganic Particles P2 (Titanium Oxide Particles)

Titanium oxide particles R-62N manufactured by Sakai Chemical Industry Co., Ltd. were used as inorganic particles P2. The average particle diameter was 0.3 μm. The titanium oxide particles were surface-treated with $SiO_2$ and $Al_2O_3$. The content of $SiO_2$ and $Al_2O_3$ was more than 0.1% by mass. The aspect ratio was 1.4.

Inorganic Particles P3 (Barium Sulfate Particles)

As inorganic particles P3, precipitated barium sulfate TS-1 manufactured by TAKEHARA KAGAKU KOGYO CO., LTD. was used. The inorganic particles P3 were analyzed in the same manner as in the case of the inorganic particles P1, and the result showed that the content of $SiO_2$ was 0.1% by mass or less, and the content of $Al_2O_3$ was 0.1% by mass or less. Thus, it was determined that the inorganic particles P3 did not substantially contain $SiO_2$ and $Al_2O_3$. The average particle diameter determined by the same method was 0.6 μm. The aspect ratio was 1.5.

Inorganic Particles P4 (Barium Sulfate Particles)

As inorganic particles P 4, tabular barium sulfate HF manufactured by Sakai Chemical Industry Co., Ltd. was used. The inorganic particles P4 were analyzed in the same manner as in the case of the inorganic particles P1, and the result showed that the content of $SiO_2$ was 0.1% by mass or less, and the content of $Al_2O_3$ was 0.1% by mass or less. Thus, it was determined that the inorganic particles P4 did not substantially contain $SiO_2$ and $Al_2O_3$. The average particle diameter determined by the same method was 4.0 μm. The aspect ratio was 13.3.

Conductive particles D4

As conductive particles D4 (spherical silver particles D4), spherical silver powder (AG2-1 manufactured by DOWA Electronics, the average particle diameter was 1.3 μm) was used.

In addition, the ratio of the average particle diameter of the inorganic particles shown in Table 2 above and the average particle diameter of the conductive particles shown in Table 3 below (average particle diameter of inorganic particles/average particle diameter of conductive particles) was calculated. The results are also shown in Table 2 above.

TABLE 3

| Conductive particles (silver particles) | D1 | D2 | D3 | D4 |
|---|---|---|---|---|
| Shape | Scaly silver powder | Irregular-shaped aggregated silver powder | Irregular-shaped aggregated silver powder | Spherical silver powder |
| Average particle diameter (μm) | 1.3 | 6.0 | 2.1 | 1.3 |

In the following experiment 1, the stretchable conductor sheet according to the first embodiment of the present invention was prepared, the isotropic property of the sheet

TABLE 2

| Inorganic particles | | P1 Barium sulfate | P2 Titanium oxide | P3 Barium sulfate | P4 Tabular barium sulfate |
|---|---|---|---|---|---|
| Average particle diameter (μm) | | 0.3 | 0.3 | 0.6 | 4.0 |
| Surface treatment | | $SiO_2$—$Al_2O_3$ | $SiO_2$—$Al_2O_3$ | — | — |
| Aspect ratio | | 1.3 | 1.4 | 1.5 | 13.3 |
| Average, particle diameter of the inorganic particles/ | D2 | 0.05 | 0.05 | 0.10 | 0.67 |
| Average particle diameter of | D3 | 0.14 | 0.14 | 0.29 | 1.90 |
| the conductive particles | D4 | 0.23 | 0.23 | 0.46 | 3.08 |

In this example, D1 to D4 shown in Table 3 below were used as conductive particles (silver particles).

Conductive Particles D1

As conductive particles D1, scaly silver powder (FA-D-3 manufactured by DOWA Electronics, the average particle diameter was 1.3 μm) was used.

Conductive particles D2

As conductive panicles D2, irregular-shaped aggregated silver powder (G-35 manufactured by DOWA Electronics, the average particle diameter was 6.0 μm) was used.

Conductive particles D3

As conductive particles D3 (aggregated silver particles D3), irregular-shaped aggregated silver powder obtained by wet classification of the conductive particles D2 (G-35 manufactured by DOWA Electronics) was used. The average particle diameter was 2.1 μm.

was evaluated. The evaluation results are shown in Table 4-1 below. In the following experiment 2, the stretchable conductor sheet according to the second embodiment of the present invention was prepared, the twist property of the sheet was evaluated. The evaluation results are shown in Table 4-2 below. In the following experiment 3, the stretchable conductor sheet according to the third embodiment of the present invention was prepared, the compression resistance and the washing durability of the sheet were evaluated. The evaluation results are shown in Table 4-3 below.

Experiment 1

Paste for Forming Stretchable Conductor Sheet

As shown in Table 4-1, the components were blended, and then kneaded by a three-roll mill to prepare pastes for forming a stretchable conductor sheet in Examples 11 to 17 and Comparative Examples 11 to 13.

Stretchable Conductor Sheet

A paste fix forming a stretchable conductor sheet in each of Examples 11 to 17 and Comparative Examples 11 to 13 as shown in Table 4-1 was applied onto a Teflon (registered trademark) sheet by an applicator to form a film (application direction (A)), and drying was performed at 120° C. for 20 minutes to form a stretchable conductor sheet having a thickness of 50 μm. For the obtained stretchable conductor sheet, the specific resistance in a natural state (elongation ratio: 0%) was measured by the above-described method. In addition, the specific resistances at the time of elongation by 40% in the application direction (A) and the specific resistance at the time of elongation by 40% in the direction (B) perpendicular to the application direction (A) were each measured, and the specific resistance change ratio (specific resistance change ratio at the time of elongation by 40%) was calculated. The results are shown in Table 4-1 below. As reference data, the results of measuring the specific resistance at the time of elongating by 20% are also shown in Table 4-1 below.

Table 4-1 below reveals that in Examples 11 to 17, the obtained stretchable conductor sheet had favorable isotropic property because the requirements specified in the first embodiment of the present invention were satisfied. On the other hand, the paste used in Comparative Example 11 did not satisfy the requirements specified in the first embodiment of the present invention, and therefore the isotropic property was not improved. In Comparative Example 12, it was not possible to improve the isotropic property because inorganic particles were not contained. In Comparative Example 13, the isotropic property was not improved because the inorganic particles were not surface-treated with a hydroxide and/or an oxide of one or both of Al and Si.

TABLE 4-1

| | | Example 11 | Example 12 | Example 13 | Example 14 | Example 15 |
|---|---|---|---|---|---|---|
| Flexible resin (parts by mass) | R1(NBR) | 10 | 10 | | | 10 |
| | R2(NBR) | | | 13 | | |
| | R3(SBR) | | | | 8 | |
| | Total | 10 | 10 | 13 | 8 | 10 |
| Conductive particles (parts by mass) | D1(Scaly silver powder) | | 55 | 52 | 55 | |
| | D2(Irregular-shaped aggregated silver powder) | 55 | | | | 56 |
| | Total | 55 | 55 | 52 | 55 | 56 |
| Inorganic particles (parts by mass) | P1(Barium sulfate) | 5 | | | | 2 |
| | P2(Titanium oxide) | | 5 | 5 | 7 | |
| | P3(Barium sulfate) | | | | | |
| | Total | 5 | 5 | 5 | 7 | 2 |
| Solvent (parts by mass) | Isophorone | 30 | 30 | 30 | 30 | 32 |
| Amount of the inorganic particles based on 100% by mass of a total of the conductive particles and the inorganic particles (% by mass) | | 8.3 | 8.3 | 8.8 | 11.3 | 3.4 |
| Amount of the flexible resin based on 100% by mass of a total of the conductive particles, the inorganic particles and the flexible resin (% by mass) | | 14.3 | 14.3 | 18.6 | 11.4 | 14.7 |
| Specific resistance ($\Omega$ cm) | elongation by 0% | $1.5 \times 10^{-4}$ | $1.3 \times 10^{-4}$ | $2.4 \times 10^{-4}$ | $1.0 \times 10^{-4}$ | $1.6 \times 10^{-4}$ |
| Specific resistance at the time of elongation in application direction ($\Omega$ cm) | elongation by 20% | $2.8 \times 10^{-4}$ | $2.6 \times 10^{-4}$ | $5.0 \times 10^{-4}$ | $2.2 \times 10^{-4}$ | $2.8 \times 10^{-4}$ |
| | elongation by 40% | $4.5 \times 10^{-4}$ | $4.0 \times 10^{-4}$ | $8.0 \times 10^{-4}$ | $2.9 \times 10^{-4}$ | $4.5 \times 10^{-4}$ |
| Specific resistance at the time of orthogonal elongation in application direction ($\Omega$ cm) | elongation by 20% | $2.8 \times 10^{-4}$ | $2.6 \times 10^{-4}$ | $5.1 \times 10^{-4}$ | $2.2 \times 10^{-4}$ | $2.9 \times 10^{-4}$ |
| | elongation by 40% | $4.6 \times 10^{-4}$ | $4.1 \times 10^{-4}$ | $8.3 \times 10^{-4}$ | $3.0 \times 10^{-4}$ | $4.8 \times 10^{-4}$ |
| Specific resistance change ratio at the time of elongation by 40%(%)✕1 | | −2.2 | −2.4 | −3.6 | −3.3 | −6.2 |
| Reference: Specific resistance change ratio at the time of elongation by 20%(%) | | 0.0 | 0.0 | −2.0 | 0.0 | −3.3 |

| | | Example 16 | Example 17 | Comparative Example 11 | Comparative Example 12 | Comparative Example 13 |
|---|---|---|---|---|---|---|
| Flexible resin (parts by mass) | R1(NBR) | 16 | 8 | 10 | 10 | 10 |
| | R2(NBR) | | | | | |
| | R3(SBR) | | | | | |
| | Total | 16 | 8 | 10 | 10 | 10 |
| Conductive particles (parts by mass) | D1(Scaly silver powder) | | | 58 | 58 | 55 |
| | D2(Irregular-shaped aggregated silver powder) | 55 | 58 | | | |
| | Total | 55 | 58 | 58 | 58 | 55 |
| Inorganic particles (parts by mass) | P1(Barium sulfate) | 5 | 6 | 1 | | |
| | P2(Titanium oxide) | | | | | |
| | P3(Barium sulfate) | | | | | 5 |
| | Total | 5 | 6 | 1 | 0 | 5 |
| Solvent (parts by mass) | Isophorone | 24 | 28 | 31 | 32 | 30 |
| Amount of the inorganic particles based on 100% by mass of a total of the conductive particles and the inorganic particles (% by mass) | | 8.3 | 9.4 | 1.7 | 0.0 | 8.3 |
| Amount of the flexible resin based on 100% by mass of a total of the conductive particles, the inorganic particles and the flexible resin (% by mass) | | 21.1 | 11.1 | 14.5 | 14.7 | 14.3 |

TABLE 4-1-continued

| | | | | | | |
|---|---|---|---|---|---|---|
| Specific resistance ($\Omega$ cm) | elongation by 0% | $4.5 \times 10^{-4}$ | $0.9 \times 10^{-4}$ | $1.2 \times 10^{-4}$ | $1.3 \times 10^{-4}$ | $1.4 \times 10^{-4}$ |
| Specific resistance at the time of elongation in application direction ($\Omega$ cm) | elongation by 20% | $8.6 \times 10^{-4}$ | $1.9 \times 10^{-4}$ | $2.6 \times 10^{-4}$ | $2.7 \times 10^{-4}$ | $2.7 \times 10^{-4}$ |
| | elongation by 40% | $1.3 \times 10^{-3}$ | $3.5 \times 10^{-4}$ | $4.0 \times 10^{-4}$ | $4.1 \times 10^{-4}$ | $4.2 \times 10^{-4}$ |
| Specific resistance at the time of orthogonal elongation in application direction ($\Omega$ cm) | elongation by 20% | $9.0 \times 10^{-4}$ | $1.9 \times 10^{-4}$ | $2.8 \times 10^{-4}$ | $3.2 \times 10^{-4}$ | $3.0 \times 10^{-4}$ |
| | elongation by 40% | $1.4 \times 10^{-3}$ | $3.6 \times 10^{-4}$ | $4.6 \times 10^{-4}$ | $5.9 \times 10^{-4}$ | $5.3 \times 10^{-4}$ |
| Specific resistance change ratio at the time of elongation by 40%(%)※1 | | −7.1 | −2.8 | −13.0 | −30.5 | −20.8 |
| Reference: Specific resistance change ratio at the time of elongation by 20%(%) | | −4.4 | 0.0 | −7.1 | −15.6 | −10.0 |

※1 Isotropic property (a specific resistance change ratio) [%] = [(specific resistance at the time of elongation in application direction/specific resistance at the time of orthogonal elongation in application direction) − 1] × 100

Experiment 2

Paste for Form Stretchable Conductor Sheet

As shown in Table 4-2 the components were blended, and then kneaded by a three-roll mill to prepare pastes for forming a stretchable conductor sheet in Examples 21 to 27 and Comparative Examples 21 to 23.

Stretchable Conductor Sheet

A paste for forming a stretchable conductor sheet in each of Examples 21 to 27 and Comparative Examples 21 to 23 was applied onto a Teflon (registered trademark) sheet by an applicator to form a film, and drying was performed at 120° C. for 20 minutes to form a stretchable conductor sheet having a thickness of 50 μm. For the obtained stretchable conductor sheet, the specific resistance of the stretchable conductor sheet in an initial state and the specific resistance of the stretchable conductor sheet after repeating twist cycles in a twist test 100 times were each measured by the above-described method, and a change in specific resistance (specific resistance of stretchable conductor sheet after repeating twist cycles in twist test 100 times/specific resistance of stretchable conductor sheet in initial state) was calculated. The components and the amounts thereof, the specific resistances, and the changes in specific resistance are shown in Table 4-2 below Table 4-2 below reveals that in Examples 21 to 27, the obtained stretchable conductor sheet had favorable twist properly because the requirements specified in the second embodiment of the present invention were satisfied. On the other hand, the paste used in Comparative Example 21 did not satisfy the requirements specified in the second embodiment of the present invention, and therefore the twist property was not improved. In Comparative Example 22, it was not possible to improve the twist property because inorganic particles were not contained. In Comparative Example 23, it was impossible to improve twist property because the aspect ratio of the inorganic particles was 1.5 or more.

TABLE 4-2

| | | Example 21 | Example 22 | Example 23 | Example 24 | Example 25 |
|---|---|---|---|---|---|---|
| Flexible resin (parts by mass) | R1(NBR) | 10 | 10 | | | 10 |
| | R2(NBR) | | | 13 | | |
| | R3(SBR) | | | | 8 | |
| | Total | 10 | 10 | 13 | 8 | 10 |
| Conductive particles (parts by mass) | D1(Scaly silver powder) | | 55 | 52 | 55 | |
| | D2(Irregular-shaped aggregated silver powder) | 55 | | | | 56 |
| | Total | 55 | 55 | 52 | 55 | 56 |
| Inorganic particles (parts by mass) | P1(Barium sulfate) | 5 | | | | 2 |
| | P2(Titanium oxide) | | 5 | 5 | 7 | |
| | P4(Tabular barium sulfate) | | | | | |
| | Total | 5 | 5 | 5 | 7 | 2 |
| Solvent (parts by mass) | Isophorone | 30 | 30 | 30 | 30 | 32 |
| Amount of the inorganic particles based on 100% by mass of a total of the conductive particles and the inorganic particles (% by mass) | | 8.3 | 8.3 | 8.8 | 11.3 | 3.4 |
| Amount of the flexible resin based on 100% by mass of a total of the conductive particles, the inorganic particles and the flexible resin (% by mass) | | 14.3 | 14.3 | 18.6 | 11.4 | 14.7 |
| Specific resistance ($\Omega$ cm) | before the tests | $1.5 \times 10^{-4}$ | $1.3 \times 10^{-4}$ | $2.4 \times 10^{-4}$ | $1.0 \times 10^{-4}$ | $1.6 \times 10^{-4}$ |
| | after twist test 100 times | $1.9 \times 10^{-4}$ | $2.0 \times 10^{-4}$ | $4.5 \times 10^{-4}$ | $1.6 \times 10^{-4}$ | $2.8 \times 10^{-4}$ |
| A change in specific resistance after twist test (times) | | 1.3 | 1.5 | 1.9 | 1.6 | 1.8 |

| | | Example 26 | Example 27 | Comparative Example 21 | Comparative Example 22 | Comparative Example 23 |
|---|---|---|---|---|---|---|
| Flexible resin (parts by mass) | R1(NBR) | 16 | 8 | 10 | 10 | 10 |
| | R2(NBR) | | | | | |
| | R3(SBR) | | | | | |
| | Total | 16 | 8 | 10 | 10 | 10 |

TABLE 4-2-continued

| | | | | | | |
|---|---|---|---|---|---|---|
| Conductive particles (parts by mass) | D1(Scaly silver powder) | | | 58 | 58 | 55 |
| | D2(Irregular-shaped aggregated silver powder) | 55 | 58 | | | |
| | Total | 55 | 58 | 58 | 58 | 55 |
| Inorganic particles (parts by mass) | P1(Barium sulfate) | 5 | 6 | 1 | | |
| | P2(Titanium oxide) | | | | | |
| | P4(Tabular barium sulfate) | | | | | 5 |
| | Total | 5 | 6 | 1 | 0 | 5 |
| Solvent (parts by mass) | Isophorone | 24 | 28 | 31 | 32 | 30 |
| Amount of the inorganic particles based on 100% by mass of a total of the conductive particles and the inorganic particles (% by mass) | | 8.3 | 9.4 | 1.7 | 0.0 | 8.3 |
| Amount of the flexible resin based on 100% by mass of a total of the conductive particles, the inorganic particles and the flexible resin (% by mass) | | 21.1 | 11.1 | 14.5 | 14.7 | 14.3 |
| Specific resistance ($\Omega$ cm) | before the tests | $4.5 \times 10^{-4}$ | $0.9 \times 10^{-4}$ | $1.2 \times 10^{-4}$ | $1.3 \times 10^{-4}$ | $1.4 \times 10^{-4}$ |
| | after twist test 100 times | $8.5 \times 10^{-4}$ | $1.3 \times 10^{-4}$ | $4.0 \times 10^{-4}$ | $6.3 \times 10^{-4}$ | $4.3 \times 10^{-4}$ |
| A change in specific resistance after twist test (times) | | 1.9 | 1.4 | 3.3 | 4.8 | 3.1 |

Experiment 3

Paste for Forming Stretchable Conductor Sheet

As shown in Table 4-3, the components were blended, and then kneaded by a three-roll mill to prepare pastes for forming a stretchable conductor sheet in Examples 31 to 39 and Comparative Examples 31 and 32.

Stretchable Conductor Sheet

A paste for forming a stretchable conductor sheet in each of Examples 31 to 39 and Comparative Examples 31 and 32 was applied onto a Teflon (registered trademark) sheet by an applicator to form a film, and drying was performed at 120° C. for 20 minutes to form a stretchable conductor sheet having a thickness of 50 μm. For the obtained stretchable conductor sheet the initial specific resistance and the specific resistance at the time of compression by 10% were each measured by the above-described method, and the ratio of the specific resistances was calculated. In addition, the specific resistance after washing (washing durability) and the change in washing durability specific resistance (specific resistance after washing/initial specific resistance) were evaluated. The components and the amounts thereof the void ratios, the specific resistances, the changes in specific resistance, the specific resistances after washing (washing durability) and the changes in washing durability specific resistance (specific resistance after washing/initial specific resistance) are shown in Table 4-3 below.

Table 4-3 below reveals that in Examples 31 to 39, the obtained stretchable conductor sheet had favorable compression resistance and washing resistance because the requirements specified in the third embodiment of the present invention were satisfied. On the other hand, the pastes used in Comparative Examples 31 and 32 did not satisfy the requirements specified in the third embodiment of the present invention, and therefore compression resistance and washing resistance were not improved.

TABLE 4-3

| | | Example 31 | Example 32 | Example 33 | Example 34 | Example 35 | Example 36 |
|---|---|---|---|---|---|---|---|
| Flexible resin (parts by mass) | R1(NBR) | 10 | 10 | | | 10 | 16 |
| | R2(NBR) | | | 12 | | | |
| | R3(SBR) | | | | 8 | | |
| | Total | 10 | 10 | 12 | 8 | 10 | 16 |
| Conductive particle (parts by mass) | D2(Irregular-shaped aggregated silver powder) | 55 | | | | 56 | 55 |
| | D3(Irregular-shaped aggregated silver powder) | | 55 | 53 | 55 | | |
| | D4(Spherical silver powder) | | | | | | |
| | Total | 55 | 55 | 53 | 55 | 56 | 55 |
| Inorganic particles (parts by mass) | P1(Barium sulfate) | 5 | | | | 2 | 5 |
| | P2(Titanium oxide) | | 5 | 5 | 7 | | |
| | P4(Tabular barium sulfate) | | | | | | |
| | Total | 5 | 5 | 5 | 7 | 2 | 5 |
| Solvent (parts by mass) | Isophorone | 30 | 30 | 30 | 30 | 32 | 24 |
| Amount of the inorganic particles based on 100% by mass of a total of the conductive particles and the inorganic particles (% by mass) | | 8.3 | 8.3 | 8.6 | 11.3 | 3.4 | 8.3 |
| Amount of the flexible resin based on 100% by mass of a total of the conductive particles, the inorganic particles and the flexible resin (% by mass) | | 14.3 | 14.3 | 17.1 | 11.4 | 14.7 | 21.1 |

TABLE 4-3-continued

| | | | | | | | |
|---|---|---|---|---|---|---|---|
| Void ratio (%) | | 35.0 | 18.0 | 16.0 | 29.0 | 37.0 | 20.0 |
| Specific resistance (Ω cm) | before the tests | $1.5 \times 10^{-4}$ | $1.3 \times 10^{-4}$ | $2.4 \times 10^{-4}$ | $1.0 \times 10^{-4}$ | $1.6 \times 10^{-4}$ | $4.5 \times 10^{-4}$ |
| | after 100 compression tests | $1.7 \times 10^{-4}$ | $1.9 \times 10^{-4}$ | $3.8 \times 10^{-4}$ | $1.3 \times 10^{-4}$ | $2.2 \times 10^{-4}$ | $7.5 \times 10^{-4}$ |
| | after washing 50 times (5 times washing × 10 times) | $2.3 \times 10^{-4}$ | $2.4 \times 10^{-4}$ | $4.7 \times 10^{-4}$ | $1.7 \times 10^{-4}$ | $2.6 \times 10^{-4}$ | $9.6 \times 10^{-4}$ |
| A change in specific resistance after compression test (times) | | 1.1 | 1.5 | 1.6 | 1.3 | 1.4 | 1.7 |
| Washing durability: Change in specific resistance (times) | | 1.5 | 1.8 | 2.0 | 1.7 | 1.6 | 2.1 |

| | | | Example 37 | Example 38 | Example 39 | Comparative Example 31 | Comparative Example 32 |
|---|---|---|---|---|---|---|---|
| Flexible resin (parts by mass) | R1(NBR) | | 8 | 8 | 8 | 13 | 8 |
| | R2(NBR) | | | 2 | | | |
| | R3(SBP) | | | | 2 | | |
| | Total | | 8 | 10 | 10 | 13 | 8 |
| Conductive particle (parts by mass) | D2(Irregular-shaped aggregated silver powder) | | 58 | 60 | 30 | | |
| | D3(Irregular-shaped aggregated silver powder) | | | | 30 | 52 | |
| | D4(Spherical silver powder) | | | | | | 55 |
| | Total | | 58 | 60 | 60 | 52 | 55 |
| Inorganic particles (parts by mass) | P1(Barium sulfate) | | 6 | | | | |
| | P2(Titanium oxide) | | | | | | 5 |
| | P4(Tabular barium sulfate) | | | | | 5 | |
| | Total | | 6 | 0 | 0 | 5 | 5 |
| Solvent (parts by mass) | Isophorone | | 28 | 30 | 30 | 30 | 32 |
| Amount of the inorganic particles based on 100% by mass of a total of the conductive particles and the inorganic particles (% by mass) | | | 9.4 | 0.0 | 0.0 | 8.8 | 8.3 |
| Amount of the flexible resin based on 100% by mass of a total of the conductive particles, the inorganic particles and the flexible resin (% by mass) | | | 11.1 | 14.3 | 14.3 | 18.6 | 11.8 |
| Void ratio (%) | | | 45.0 | 33.0 | 12.0 | 9.0 | 6.0 |
| Specific resistance (Ω cm) | before the tests | | $0.9 \times 10^{-4}$ | $1.4 \times 10^{-4}$ | $1.2 \times 10^{-4}$ | $2.8 \times 10^{-4}$ | $3.5 \times 10^{-4}$ |
| | after 100 compression tests | | $1.0 \times 10^{-4}$ | $2.2 \times 10^{-4}$ | $1.7 \times 10^{-4}$ | $7.0 \times 10^{-4}$ | $1.2 \times 10^{-3}$ |
| | after washing 50 times (5 times washing × 10 times) | | $1.6 \times 10^{-4}$ | $2.4 \times 10^{-4}$ | $2.0 \times 10^{-4}$ | $1.2 \times 10^{-3}$ | $2.5 \times 10^{-3}$ |
| A change in specific resistance after compression test (times) | | | 1.1 | 1.6 | 1.4 | 2.5 | 3.4 |
| Washing durability: Change in specific resistance (times) | | | 1.8 | 1.7 | 1.7 | 4.2 | 7.1 |

Application Example 1 (Preparation of Wiring)

The paste for forming a stretchable conductor sheet, which had been obtained in each of the experiments 1 to 3, was used for a conductive layer. A laminate in which a first insulating layer and a second insulating layer were provided on both surfaces of the sheet was prepared, and cut into a horseshoe shape to prepare a horseshoe-shaped wiring (corrugated wiring).

Resin for Forming Insulating Layer 9 parts by mass of a polyurethane resin ("UREARNO (registered trademark) W600" manufactured by Arakawa Chemical Industries, Ltd. (polyester-based anionic aqueous polyurethane, urethane resin content: 35% by mass, isopropyl alcohol content: 5% by mass viscosity: 300 to 30 mPa·s (25° C.)) was mixed with a mixed liquid (4 parts by mass) of 1 part by mass of a thickener ("ACTGEL AP200" manufactured by SENKA Corporation, acrylic acid-based polymer) and 10 parts by mass of water to obtain a resin for forming an insulating layer.

The resin for forming an insulating layer was applied to a release sheet in such a manner that the first insulating layer had a thickness (dry thickness) of 35 μm, and drying was performed in a hot air drying oven at 100° C. for 20 minutes or more to form the first insulating layer.

Next, the paste for forming a stretchable conductor sheet, which was prepared in Example 12, 22 or 31, was applied onto a release sheet in a dry thickness of 60 μm, and drying was performed in a hot air drying oven at 120° C. for 30 minutes or more to prepare a sheet-shaped conductive layer with a release sheet. The conductive layer with a release sheet was cut into a length of 15 cm and a width of 1 cm, the release sheet was peeled off, and the conductive layer was stacked on the first insulating layer.

Next, a resin for forming air insulating layer, which was identical to the resin used for forming the first insulating layer, was applied in a dry thickness of 35 μm to a region covering the stacked conductive layer and having a length of 10 cm and a width of 3 cm, and drying was performed in a hot air drying oven at 100° C. for 20 minutes or more to form the second insulating layer, thereby obtaining a conductive laminate. The laminate was cut into a horseshoe shape to prepare a horseshoe-shaped wiring (see FIG. 7). The obtained horseshoe-shaped wiring exhibited stretching property.

Application Example 2

A rectangular pattern having a width of 50 mm and a length of 450 mm between the front hem portion and the front collar portion of a knitted sportswear (shirt) was coated with a water-dispersible urethane resin so as to have a dry areal weight of 50 mg/cm2, followed by drying and curing to form a urethane underlayer. Next, two wirings having a width of 10 mm and a length of 430 mm were formed on the urethane resin layer by screen printing using the paste for forming a stretchable conductor sheet, which had been obtained in Example 11, 21 or 32, so as to be placed such that a distance from the edge of the urethane underlayer was about 10 mm and so as to have a dry film thickness of 28 μm, and then dried and cured at 120° C. for 30 minutes in a drying oven to obtain a sports shirt with a wiring. 15 mm of the hem portion and 15 mm of the collar portion of the obtained wirings were each covered with a masking tape, and the wiring portion was provided with insulation by coating with a water-dispersible urethane and further drying. Then, the masking tape was peeled off, and the part that had been covered with the masking tape was subjected to printing with the carbon paste C17 (obtained by preliminarily stirring 24 parts by mass of a flexible resin (R1), 4 parts by mass of Ketjen black and 30 parts by mass of isophorone, and then kneading and dispersing the mixture by a three-roll mill) by a screen printing method so that a dry film thickness became 15 μm, followed by drying and curing at 120° C. for 20 minutes to obtain an electrode portion.

Stainless steel hooks were sewn on the hem portion and the collar portion of the electrode thus obtained of the sports shirt with a wiring using a sewing thread and a conductive thread in combination, and a detachable mini pin jack was attached using the hooks of both the hem and collar portions. When a headphone stereo was connected via the sports shirt having the mini pin jack, it was possible to listen to music reproduced with good sound quality both during being at rest and during jogging.

Application Example 3

A synthetic leather glove was placed on a flat hand-shaped plate made of a plastic plate having a thickness of 5 mm so as not to make wrinkles. Using a screen printing machine, the paste for forming a stretchable conductor sheet, which had been obtained in Example 11, 21 or 32, was applied to the glove to print a conductive pattern shown in FIG. 4. Subsequently, drying was performed at 100° C. for 120 minutes to obtain a glove with a wiring. Lead wires were attached to the electrodes in a portion corresponding to a wrist of the obtained glove with a wiring by using a conductive adhesive to achieve such a configuration that the resistance change of the wiring in accordance with bending of each joint can be read by a multichannel resistance meter.

Using the obtained device configuration, first, a user wore a glove type input device on the right hand, a resistance value of a portion corresponding to each joint of the hand in an opened state, which is a state of "paper" of scissors-paper-rock, was set as an initial value, and a resistance value of that of the hand in a closed state, which is a state of "rock" of scissors-paper-rock, was set as a limit value. A range of change in resistance of each joint between these two states was divided into 64 gradations, and by bring the 64 gradations into correspondence with the bending and stretching states of joints, a three-dimensional image of fingers CG-synthesized by software was operated. The movement of the resulting CG fingers was natural, smooth and excellent. In addition, it was also possible to replicate complex movement such as "scissors-paper-rock" and fingerspelling.

Application Example 4

First, a predetermined pattern was printed on a release PET film having a thickness of 125 μm using the stretchable insulating resin ink (C18) (obtained by mixing and dissolving 7.5 parts by mass of an epoxy resin, 30 parts by mass of a flexible resin (R2) and 0.5 parts by mass of a curing agent with 30 parts by mass of isophorone) for forming a cover coat layer, dried and cured. The pattern corresponded to a land section that covers the periphery of an electrode portion in a ring shape and an insulating coating section that covers the electrical wiring portion composed of the stretchable conductor. The land section covered the outer circumference 3 mm of an electrode pattern described later, and had a ring width of 5 mm. The insulating coating section had a width of 16 mm and covered the stretchable conductor having a width of 10 mm. The dry thickness of the cover coat layer was adjusted to be 20 μm.

Next, using the stretchable carbon paste (C17) (obtained by preliminarily stilling 24 parts by mass of a flexible resin (R1), 4 parts by mass of Ketjen black and 30 parts by mass of isophorone, and then kneading and dispersing the mixture by a three-roll mill), printing was performed on a portion to be an electrode portion, followed by drying and curing. The electrode portion was a circle having a diameter of 50 mm arranged concentrically with the ring of the previously printed cover coat layer. The dry film thickness of the stretchable carbon paste layer was 15 μm.

Next, the electrode portion and the electrical wiring portion were printed using the paste for forming a stretchable conductor sheet, which had been obtained in Example 12, 22 or 31 and which was to be a stretchable conductor. The electrode portion had a circular shape with a diameter of 50 mm, and was arranged concentrically with the ring-shaped land section. The electrical wiring portion had a width of 10 mm. The dry thickness of the stretchable conductor portion was adjusted to be 50 μm by repeating the process from printing to drying (see FIG. 5).

Further, using the stretchable insulating resin ink used for the cover coat layer, printing was performed so as to cover all the printed patterns including the cover coat layer, and a weak drying operation was performed at 60° C. for 10 minutes so that the solvent was intentionally left and tackiness remained to obtain a transferable printed electrode wiring sheet. Subsequently, the transferable printed electrode wiring obtained by the above processes was overlaid on a predetermined portion of the sports shirt turned inside out and hot-pressed to transfer the printed matter from the release PET film to the sports shirt, followed by drying at 115° C. for 30 minutes, whereby a sports shirt with an electrical wiring was obtained (see FIG. 6).

In the obtained sports shirt with an electrical wiring, the circular electrode having a diameter 50 mm was placed on the intersection of each of left and right posterior axillary lines and the seventh rib, and the electrical wiring composed of the stretchable conductor composition having a width of 10 mm was formed from each of the circular electrodes to the center of the chest on the inside of the sports shirt. The wirings extending from the left and right electrodes to the center of the chest had a gap of 5 mm therebetween at the center of the chest, and both wirings were not short-circuited (see FIG. 6).

Subsequently, a stainless steel hook was attached on a surface side of the sports shirt at the center of the back surface of the neck where no cover coat layer of the left and right wiring portions was disposed, and in order to ensure electrical continuity with the wiring portion on a back side of the surface, the stainless steel hook was electrically connected to the stretchable conductor composition layer using a conductive yarn in which a fine metal wire was twisted.

Heart rate sensor WHS-2 manufactured by Union Tool Co. was connected via the stainless steel hook, and was programed so that a heart rate data could be received and displayed with a smartphone manufactured by Apple in which the application "myBeat" designed specifically for the heart rate sensor WHS-2 had been installed. In this way, the sports shirt in which a heart rate measurement function was incorporated was produced. This shirt was worn by a subject, and electrocardiogram data of the subject was acquired during being at rest, walking, running, riding a bicycle, driving a car, and sleeping. The acquired electrocardiogram data had less noise and a high resolution, and hence had a quality as an electrocardiogram that is capable of analyzing mental states, physical condition, fatigue, sleepiness, stress levels, or the like from the change in heart rate interval, the electrocardiogram waveform, and the like.

INDUSTRIAL APPLICABILITY

As described above, by using the paste for forming a stretchable conductor sheet according to the present invention, an electrical wiring can be formed by a printing method directly or indirectly on garments and textile products arcade of stretchable textile, fabric or the like. The electrical wiring on the textile product obtained by using the paste for forming a stretchable conductor sheet of the present invention is applicable, without being limited to the use examples shown in the above application examples, to a wearable device for detecting information of a human body such as bioelectric potential including myoelectric potential and cardiac potential, and biological information including body temperature, pulse, blood pressure, and the like with a sensor or the like provided in a garment; a garment incorporating an electric heating device; a wearable device incorporating a sensor for measuring a clothing pressure; wear that measures a body size by using a clothing pressure; a sock-type device for measuring a pressure of a sole of foot; a garment in which flexible solar cell modules are integrated in textiles; a wiring part of a tent, bag or the like; a low frequency treatment apparatus having a joint part; a wiring part of a thermal treatment apparatus or the like; a sensing part of degree of flexion, and the like. Such wearable devices can be used for not only a human body but also an animal such as pet or livestock, can be applied to a mechanical device having an expandable portion, a bending portion, and the like, and can also be used as an electrical wiring of a system that is used by connecting a mechanical device such as a robotic prosthetic arm or leg to a human body. It is also useful as a wiring material for patchable devices to be attached to the skin or mucous membrane of the human body, implant devices to be embedded in the body, edible devices to be applied to the digestive tract, and the like.

DESCRIPTION OF REFERENCE SIGNS

1: Fabric
2: Support
3: Paste for forming stretchable conductor sheet (stretchable conductor sheet)
4: Stretchable cover
5: Stretchable carbon
6: Release support
7: Adhesive

The invention claimed is:

1. A stretchable conductor sheet having a thickness of 3 to 800 μm, the stretchable conductor sheet comprising
at least conductive particles,
inorganic particles surface-treated with a hydroxide and/or an oxide of one or both of Al and Si, and
a flexible resin having a tensile elastic modulus of 1 MPa or more and 1000 MPa or less,
wherein the inorganic particles contain titanium oxide, and
in each of two orthogonal directions, a specific resistance change ratio of the sheet at a time of elongation by 40% with respect to an original length is less than ±10% in an elongation direction.

2. The stretchable conductor sheet according to claim 1, wherein the inorganic particles are contained in an amount of 2.0 to 30% by mass based on 100% by mass of a total of the conductive particles and the inorganic particles.

3. The stretchable conductor sheet according to claim 1, wherein the inorganic particles have an average particle diameter smaller than an average particle diameter of the conductive particles.

4. The stretchable conductor sheet according to claim 1, wherein the conductive particles have an average particle diameter of 0.5 to 20 μm, and the conductive particles are silver particles.

* * * * *